United States Patent
Yamanaka et al.

(10) Patent No.: US 8,557,378 B2
(45) Date of Patent: Oct. 15, 2013

(54) STRETCH RELEASABLE ADHESIVE TAPE

(75) Inventors: Michiko Yamanaka, Tokyo-to (JP); Michael D. Determan, Mahtomedi, MN (US); Albert I. Everaerts, Oakdale, MN (US); Thu-Van T. Tran, Maplewood, MN (US); Jayshree Seth, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 229 days.

(21) Appl. No.: 13/142,004

(22) PCT Filed: Dec. 29, 2009

(86) PCT No.: PCT/US2009/069714
§ 371 (c)(1),
(2), (4) Date: Jun. 24, 2011

(87) PCT Pub. No.: WO2010/078346
PCT Pub. Date: Jul. 8, 2010

(65) Prior Publication Data
US 2011/0253301 A1    Oct. 20, 2011

Related U.S. Application Data

(60) Provisional application No. 61/141,767, filed on Dec. 31, 2008.

(51) Int. Cl.
*B32B 7/12* (2006.01)
*B32B 15/04* (2006.01)

(52) U.S. Cl.
USPC .............. 428/343; 428/354; 428/355 AC

(58) Field of Classification Search
USPC ................... 428/343, 354, 355 AC
See application file for complete search history.

(56) References Cited

U.S. PATENT DOCUMENTS

| | | |
|---|---|---|
| 4,024,312 A | 5/1977 | Korpman |
| 4,415,615 A | 11/1983 | Esmay |
| 4,418,120 A | 11/1983 | Kealy |
| 4,472,480 A | 9/1984 | Olson |
| 4,710,536 A | 12/1987 | Klingen |
| 4,736,048 A | 4/1988 | Brown |

(Continued)

FOREIGN PATENT DOCUMENTS

| | | |
|---|---|---|
| DE | 3331016 | 10/1984 |
| EP | 0305161 | 3/1989 |

(Continued)

OTHER PUBLICATIONS

"Handbook of Pressure Sensitive Adhesive Technology", D. Satas, $2^{nd}$ Edition, 1989, p. 172.

(Continued)

*Primary Examiner* — Victor Chang
(74) *Attorney, Agent, or Firm* — Jean A. Lown

(57) ABSTRACT

Adhesive tapes, articles containing the adhesive tapes, methods of making the adhesive tapes, and uses of the adhesive tapes are described. The adhesive tape is stretch releasable and can be used to couple two substrates together. The adhesive tape can be removed easily to separate the two substrates for any reason. The adhesive tape includes a backing layer and at least one pressure-sensitive adhesive layer adjacent to the backing layer. The backing layer contains a first acrylic copolymer. Each pressure-sensitive adhesive layer contains a second acrylic copolymer plus inorganic particles that are dispersed or suspended in the second acrylic copolymer.

16 Claims, 1 Drawing Sheet

(56) References Cited

U.S. PATENT DOCUMENTS

| | | |
|---|---|---|
| 4,749,590 A | 6/1988 | Klingen |
| 4,818,610 A | 4/1989 | Zimmerman |
| 4,839,206 A | 6/1989 | Waldenberger |
| 4,894,259 A | 1/1990 | Kuller |
| 4,980,443 A | 12/1990 | Kendziorski |
| 5,082,706 A | 1/1992 | Tangney |
| 5,202,361 A | 4/1993 | Zimmerman |
| RE34,605 E | 5/1994 | Schrenk |
| 5,360,659 A | 11/1994 | Arends |
| 5,491,012 A | 2/1996 | Lühmann |
| 5,516,581 A | 5/1996 | Kreckel |
| 5,578,381 A | 11/1996 | Hamada |
| 5,579,162 A | 11/1996 | Bjornard |
| 5,677,376 A | 10/1997 | Groves |
| 5,882,774 A | 3/1999 | Jonza |
| 6,001,471 A | 12/1999 | Bries |
| 6,049,419 A | 4/2000 | Wheatley |
| 6,458,454 B1 | 10/2002 | Kreckel |
| 6,527,900 B1 | 3/2003 | Kreckel |
| 6,569,521 B1 | 5/2003 | Sheridan |
| 6,572,945 B2 | 6/2003 | Bries |
| 6,703,441 B2 | 3/2004 | Husemann |
| 6,723,407 B2 | 4/2004 | Dollase |
| 6,832,445 B2 | 12/2004 | Pitzen |
| 6,841,241 B2 | 1/2005 | Lühmann |
| 7,078,093 B2 | 7/2006 | Sheridan |
| 2001/0019764 A1 | 9/2001 | Bries |
| 2003/0134112 A1 | 7/2003 | Kreckel |
| 2003/0215630 A1 | 11/2003 | Melancon |
| 2003/0232192 A1 | 12/2003 | Kishioka |
| 2004/0109096 A1 | 6/2004 | Anderson |
| 2004/0191509 A1 | 9/2004 | Kishioka |
| 2005/0147783 A1 | 7/2005 | Fisher |
| 2006/0127666 A1 | 6/2006 | Fuchs |
| 2006/0205835 A1 | 9/2006 | Husemann |
| 2007/0213449 A1 | 9/2007 | Lewandowski |
| 2008/0280086 A1 | 11/2008 | Sheridan |
| 2011/0020640 A1 | 1/2011 | Sherman |
| 2011/0122494 A1 | 5/2011 | Sherman |
| 2011/0126968 A1 | 6/2011 | Determan |
| 2011/0134623 A1 | 6/2011 | Sherman |
| 2011/0176325 A1 | 7/2011 | Sherman |
| 2011/0182076 A1 | 7/2011 | Sherman |
| 2011/0250375 A1 | 10/2011 | Bries |
| 2011/0268929 A1 | 11/2011 | Tran |

FOREIGN PATENT DOCUMENTS

| | | |
|---|---|---|
| JP | 06504077 | 5/1994 |
| JP | 07286142 | 10/1995 |
| JP | 09502213 | 3/1997 |
| WO | WO 92/11332 | 7/1992 |
| WO | WO 96/31564 | 10/1996 |
| WO | WO 01/66664 | 9/2001 |
| WO | WO 2005/059055 | 6/2005 |
| WO | WO 2006/065373 | 6/2006 |
| WO | WO 2008/100713 | 8/2008 |
| WO | WO 2008/100755 | 8/2008 |
| WO | WO 2009/151686 | 12/2009 |

OTHER PUBLICATIONS

"Polyethylene", Internet Citation, Nov. 2003, pp. 1-6, XP002535261, Retrieved from the Internet: URL:http://www.roempp.com/prod/index.1.html [retrieved on Jul. 3, 2009], p. 1.

"Standard Test Method for Haze and Luminous Transmittance of Transparent Plastics", ASTM Designation, ASTM International, US, vol. D1003, Jul. 1, 2000, pp. 1-6, XP001179974.

International Search Report for PCT/US2009/069714, 4 pages.

US 8,557,378 B2

STRETCH RELEASABLE ADHESIVE TAPE

CROSS-REFERENCE TO RELATED APPLICATIONS

This application is a national stage filing under 35 U.S.C. 371 of PCT/US2009/069714, filed Dec. 29, 2009, which claims priority to U.S. Provisional Patent Application No. 61/141,767, filed Dec. 31, 2008, the disclosures of which are incorporated by reference in their entirety herein.

TECHNICAL FIELD

An adhesive tape that is stretch releasable, articles that include the adhesive tape, methods of making the adhesive tape, and uses of the adhesive tape are described.

BACKGROUND

Stretch releasable adhesive tapes have been used to bond an article to a substrate. The articles are often a hook, clamp, hanger, or caddie and the substrate is often the surface of a wall. The article can be released from the substrate by stretching the adhesive tape.

SUMMARY

An adhesive tape that is stretch releasable, articles that contain the adhesive tape, and uses of the adhesive tape are disclosed. The adhesive tape includes a backing layer that is adjacent to at least one pressure-sensitive adhesive layer. In many embodiments, the adhesive tape includes a backing layer that is positioned between a first pressure-sensitive layer and a second pressure-sensitive adhesive layer. The backing layer includes a first acrylic copolymer. Each pressure-sensitive adhesive layer includes a second acrylic copolymer and inorganic particles dispersed or suspended in the second acrylic copolymer. The presence of the inorganic particles in the pressure-sensitive adhesive layer facilitates clean removal of the adhesive tape after being adhered to a substrate.

In a first aspect, a stretch releasable adhesive tape is provided that includes (A) a backing layer and (B) at least one pressure-sensitive adhesive layer that is adjacent to a major surface of the backing layer. The backing layer contains a first acrylic copolymer. The first acrylic copolymer in the backing layer is a first polymerized product of a first polymerizable reaction mixture that contains (a) a first crosslinker having at least two (meth)acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture. The at least one pressure-sensitive adhesive layer contains (1) a second acrylic copolymer that is different than the first acrylic copolymer and (2) inorganic particles suspended or dispersed in the second acrylic copolymer in an amount up to 25 weight percent based on the weight of the second acrylic copolymer. The second acrylic copolymer is a second polymerized product of a second polymerizable reaction mixture that contains (a) a second crosslinker having at least two (meth)acryloyl groups in an amount up to 25 weight percent based on a total weight of polymerizable material in the second polymerizable reaction mixture and (b) either (i) a second monovalent monomer mixture containing 1) an alkyl(meth)acrylate having an alkyl group with at least 4 carbon atoms in an amount equal to at least 40 weight percent based on the total weight of polymerizable material in the second polymerizable reaction mixture and 2) a second polar monomer in an amount up to 40 weight percent based on the total weight of polymerizable material in the second polymerizable reaction mixture or (ii) a partially polymerized product of the second monovalent monomer mixture. The adhesive tape is stretch releasing and is stretchable at least 50 percent in a first direction without breaking.

In a second aspect, an article is provided. In a first embodiment, the article includes a first substrate, a second substrate, and an adhesive tape positioned between the first substrate and the second substrate. The adhesive tape couples the first substrate to the second substrate. The adhesive tape includes (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate. Pulling the tab stretches the adhesive tape and releases the adhesive tape from the first substrate, from the second substrate, or from both the first substrate and the second substrate. The adhesive tape is stretchable at least 50 percent in a first direction without breaking. The backing layer contains a first acrylic copolymer. The first acrylic copolymer is a first polymerized product of a first polymerizable reaction mixture that contains (a) a first crosslinker having at least two (meth)acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture. The first pressure-sensitive adhesive layer and the second pressure adhesive layer each contains (1) a second acrylic copolymer that is different than the first acrylic copolymer and (2) inorganic particles suspended or dispersed in the second acrylic copolymer in an amount up to 25 weight percent based on the weight of the second acrylic copolymer. The second acrylic copolymer is a second polymerized product of a second polymerizable reaction mixture that contains (a) a second crosslinker having at least two (meth)acryloyl groups in an amount up to 25 weight percent based on a total weight of polymerizable material in the second polymerizable reaction mixture and (b) either (i) a second monovalent monomer mixture containing 1) an alkyl(meth)acrylate having an alkyl group with at least 4 carbon atoms in an amount equal to at least 40 weight percent based on the total weight of polymerizable material in the second polymerizable reaction mixture and 2) a second polar monomer in an amount up to 40 weight percent based on the total weight of polymerizable material in the second polymerizable reaction mixture or (ii) a partially polymerized product of the second monovalent monomer mixture.

In a second embodiment, the article includes a first substrate and an adhesive tape adhered to the first substrate. The adhesive tape includes (A) a backing layer, (B) a first pressure-sensitive adhesive layer that is adjacent to a first major surface of the backing layer and (C) a tab that extends beyond the first substrate. Pulling the tab stretches the adhesive tape and releases the adhesive tape from the first substrate. The adhesive tape is stretchable at least 50 percent in a first direction without breaking. The backing layer contains a first acrylic copolymer. The first acrylic copolymer is a first polymerized product of a first polymerizable reaction mixture that contains (a) a first crosslinker having at least two (meth) acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture. The first pressure-sensitive adhesive layer contains (1) a second acrylic copolymer that is different than the first acrylic copolymer and (2) inorganic particles suspended or dispersed in the second acrylic copolymer in an amount up to 25 weight percent based on the weight of the second acrylic copolymer. The second acrylic copolymer is a second polymerized product of a second polymerizable reaction mixture that contains (a) a second crosslinker having at least two (meth)acryloyl groups in an amount up to 25 weight percent based on a total weight of polymerizable material in the second polymerizable reaction mixture and (b) either (i) a second monovalent monomer mixture containing 1) an alkyl(meth)acrylate having an alkyl group with at least 4 carbon atoms in an amount equal to at least 40 weight percent based on the total weight of polymerizable material in the second polymerizable reaction mixture and 2) a second polar monomer in an amount up to 40 weight percent based on the total weight of polymerizable material in the second polymerizable reaction mixture or (ii) a partially polymerized product of the second monovalent monomer mixture.

In a third aspect, a method of coupling and decoupling two substrates is provided. The method includes providing a first substrate and a second substrate. The method further includes positioning an adhesive tape between the first substrate and the second substrate such that the adhesive tape couples the first substrate to the second substrate. The adhesive tape includes (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate. The method further includes pulling on the tab of the adhesive tape to release the adhesive tape from the first substrate, from the second substrate, or from both the first substrate and the second substrate. The adhesive tape is stretchable at least 50 percent in a first direction without breaking. The backing layer contains a first acrylic copolymer that is a first polymerized product of a first polymerizable reaction mixture that contains (a) a first crosslinker having at least two (meth)acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture. The first pressure-sensitive adhesive layer and the second pressure-sensitive adhesive layer each contains (1) a second acrylic copolymer that is different than the first acrylic copolymer and (2) inorganic particles suspended or dispersed in the second acrylic copolymer in an amount up to 25 weight percent based on the weight of the second acrylic copolymer. The second acrylic copolymer is a second polymerized product of a second polymerizable reaction mixture that contains (a) a second crosslinker having at least two (meth)acryloyl groups in an amount up to 25 weight percent based on a total weight of polymerizable material in the second polymerizable reaction mixture and (b) either (i) a second monovalent monomer mixture containing 1) an alkyl (meth)acrylate having an alkyl group with at least 4 carbon atoms in an amount equal to at least 40 weight percent based on the total weight of polymerizable material in the second polymerizable reaction mixture and 2) a second polar monomer in an amount up to 40 weight percent based on the total weight of polymerizable material in the second polymerizable reaction mixture or (ii) a partially polymerized product of the second monovalent monomer mixture.

The above summary of the present invention is not intended to describe each embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
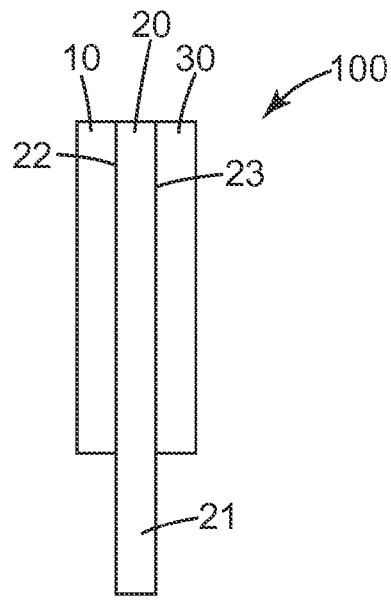
FIG. 1 is a schematic diagram of an exemplary stretch releasable adhesive tape.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Adhesive tapes, articles containing the adhesive tapes, methods of making the adhesive tapes, and uses of the adhesive tapes are described. The adhesive tape is stretch releasable and can be adhered to a single substrate or can be used to couple (i.e., adhere through the adhesive tape) two substrates together. When positioned between two substrates, the adhesive tape can be removed easily to separate the two substrates for any reason. The adhesive tape is stretched to release it from one or both substrates. In the event that the coupling of the two substrates is defective or it is desirable to reuse one or both of the substrates in another article, the adhesive tape can be removed by stretching and the two substrates can be separated without damaging either substrate.

Although various stretch releasing adhesive tapes are known, there have been problems with the use of acrylic-based adhesives in these adhesive tapes. Often, the adhesive strength of acrylic-based adhesive layers builds over time and removal can be difficult. When removal is attempted, the adhesive tapes often tend to break, leave an adhesive residue on the substrate, or both. Surprisingly, the adhesive tapes described herein can be removed without breaking the adhesive tape. The removal leaves very little or no adhesive residue on the substrates. Prior to removal by stretching, the adhesive typically exhibits high load shear adhesion.

Additionally, it has been difficult to prepare stretch releasable adhesive tapes with acrylic-based that have good release characteristics yet remain adhered to the substrate when subjected to elevated temperature and humidity conditions. Surprisingly, the adhesive tapes described herein typically remain adhered to the substrate even after exposure to elevated temperature and humidity conditions but can be removed by stretching.

As used herein, the term "adhesive" and "pressure-sensitive adhesive" are used interchangeably. Likewise, the terms "adhesive layer" and "pressure-sensitive adhesive layer" are used interchangeably. The terms "pressure-sensitive adhesive layer" and "PSA layer" are used interchangeably.

As used herein, the term "polymerizable material" refers to compounds of any molecular weight that have polymerizable groups such as ethylenically unsaturated groups. That is, the polymerizable material can include monomers, crosslinkers, oligomers, and the like. The process of polymerization results in the formation of a polymer and includes reactions that extend a polymeric chain, that crosslink one or more polymeric chains, or both. The term "copolymer" is used to refer to a polymer prepared from at least two different monomers.

As used herein, the term "in the range of" includes the endpoints and all values between the endpoints.

The stretch releasable adhesive tape includes a backing layer and at least one pressure-sensitive adhesive layer adjacent to the backing layer. In some embodiments, the stretch releasable adhesive tape includes a single pressure-sensitive adhesive layer positioned adjacent to a first major surface of the backing layer. Such a stretch releasable adhesive tape can be placed on and adhered to the outer surface of a substrate for any desired purpose. For example, the adhesive tape can provide a protective function and can be removed later if the protection is no longer needed or desired.

In other embodiments, the stretch releasable adhesive tape includes two pressure-sensitive adhesive layers that are positioned adjacent to opposite major surfaces of the backing layer. Such a stretch releasable adhesive tape can be used to couple a first substrate to a second substrate. If at any later time it is desirable to separate the first substrate from the second substrate, the adhesive tape can be stretched for removal (e.g., released from the first substrate, released from the second substrate, or released from both the first and second substrates). After separation, the substrates can be used again. This is particularly advantageous when at least one of the substrates is expensive, fragile, or difficult to manufacture.

An exemplary stretch releasable adhesive tape construction with two pressure-sensitive adhesive layers is shown schematically in FIG. 1. The adhesive tape 100 includes a backing layer 20 that is positioned between two pressure-sensitive adhesive layers 10 and 30. The first adhesive layer 10 is adjacent to a first major surface 22 of the backing layer 20 and the second adhesive layer 30 is adjacent to the second major surface 23 of the backing layer 20. The first major surface of the backing layer 20 is opposite the second major surface of the backing layer 20. As shown in FIG. 1, the first adhesive layer 10 and the second adhesive layer 30 both contact the backing layer 20 and are directly adhered to the backing layer 20. In other embodiments that are not illustrated, the first adhesive layer 10 and the second adhesive layer 30 are indirectly adhered to the backing layer 20 through one or more intervening layers such as a primer layer. The backing layer 20 extends beyond both the first adhesive layer 10 and the second adhesive layer 30. The region of the backing layer 21 that extends beyond the adhesive layers can function as a tab 21. In FIG. 1, the tab 21 is part of the backing layer.

Figure 2:
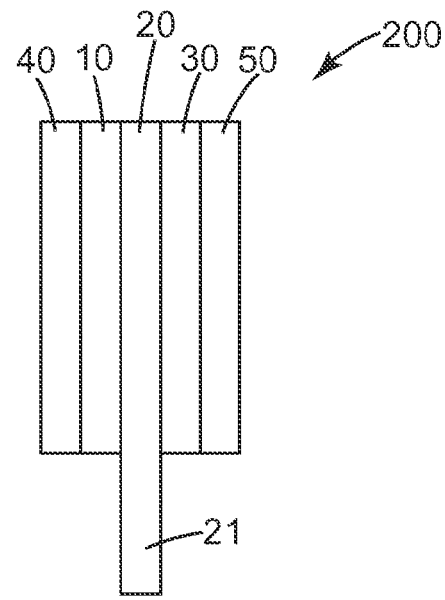
FIG. 2 is a schematic diagram of an exemplary article that includes two substrates coupled together using the stretch releasable adhesive tape exemplified in FIG. 1.

FIG. 2 is exemplary schematic diagram of two substrates coupled using the stretch releasable adhesive tape shown schematically in FIG. 1. The stretch releasable adhesive tape is positioned between a first substrate 40 and a second substrate 50. That is, the article 200 includes in the following order a first substrate 40, a first adhesive layer 10, a backing layer 20, a second adhesive layer 30, and a second substrate 50. The first adhesive layer 10 adheres to the first substrate 40 and the second adhesive layer 30 adheres to the second substrate 50. The pressure-sensitive adhesive layer typically can be adhered to a substrate with no more than finger pressure and remain adhered to the substrate until the adhesive tape is stretched for removal. The first substrate 40 is coupled to the second substrate 50 through the adhesive tape.

In FIG. 2, the backing layer 20 extends beyond both the first adhesive layer 10 and the second adhesive layer 30. The region of the backing layer that extends beyond both the first adhesive layer 10 and the second adhesive layer 30 can function as a tab 21 for stretch releasing the adhesive tape from both substrates 40 and 50. By pulling on the tab 21 and stretching the adhesive tape, the first adhesive layer 10 can be released from the first substrate 40, the second adhesive layer 30 can be released from the second substrate 50, or both adhesive layers can be released from both substrates. The combined release allows the separation of the first substrate from the second substrate and the removal of the adhesive tape from between the first substrate and the second substrate.

Figure 3:
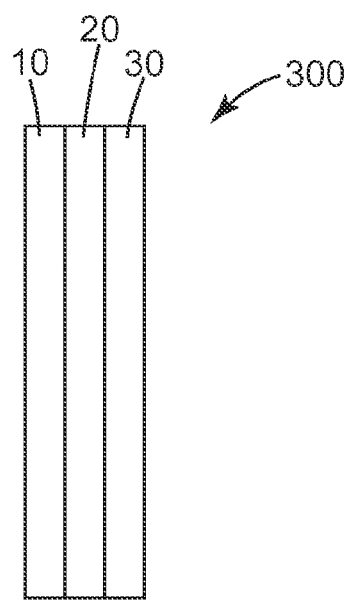
FIG. 3 is a schematic diagram of another exemplary stretch releasable adhesive tape.
Figure 4:
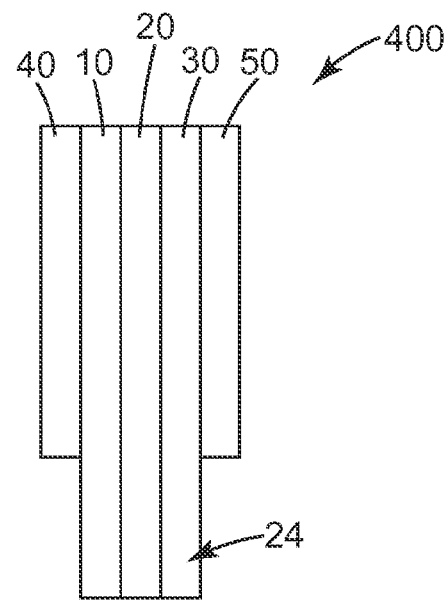
FIG. 4 is a schematic diagram of another exemplary article that includes two substrates coupled together using the stretch releasable adhesive tape exemplified in FIG. 3.

Another stretch releasable adhesive tape is shown schematically in FIG. 3. In this embodiment, the backing layer 20 does not extend beyond both the first adhesive layer 10 and the second adhesive layer 30. The use of this adhesive tape to couple a first substrate 40 and a second substrate 50 is shown schematically in FIG. 4. A region of the adhesive tape (layers 10, 20, and 30) extends beyond both substrates 40 and 50. The region of the adhesive tape that extends beyond both substrates 40 and 50 can function as the tab 22. The tab 24 is tacky because the outer surfaces are the adhesive layers 10 and 30. Alternatively, an additional layer such as a film (not shown in FIG. 3) can be placed over the adhesive layers 10 and 30 in the region of the tab to provide a non-tacky surface. By pulling on the tab 24 and stretching the adhesive tape, the first adhesive layer 10 can be released from the first substrate 40, the second adhesive layer 30 can be released from the second substrate 50, or both adhesive layers can be released from both substrates. The combined release allows the separation of the first substrate from the second substrate and the removal of the adhesive tape (layers 10, 20, and 30) from between the first substrate 40 and the second substrate 50.

Releasing the adhesive tape from one or both substrates includes pulling on a tab and stretching the adhesive tape. The tab extends beyond at least one of the substrates. That is, at least one of the substrates does not contact the adhesive tape in the region of the tab. More specifically, at least one of the substrates does not contact an adhesive layer in the region of the tab. The tab is pulled in a direction that is parallel to or substantially parallel to the surfaces of the substrates. The tab is usually pulled in a direction that is 0 degrees, less than 5 degrees, less than 10 degrees, or less than 15 degrees from the substrates. The tab is often a part of the backing layer. In some embodiments, the tab is formed from a second region of the backing layer that extends beyond a first region of the backing layer that is in contact with the adhesive layers. The tab is often non-tacky in these embodiments. In other embodiments, the tab includes the backing layer and at least one of the adhesive layers. The tab is tacky in these embodiments.

The adhesive layers and the backing layers of the adhesive tapes are typically both highly extensible. Pulling on the tab causes the adhesive tape to elongate or stretch. Stretching reduces the volume of the adhesive tape in the region between the first substrate and the second substrate and facilitates release of the adhesive tape from one or both substrates. The adhesive tape typically can be stretched at least 50 percent in a first direction (often the first direction is lengthwise) without breaking or snapping under the stretch releasing conditions. If the adhesive layers have sufficient cohesive strength, if the adhesive layers adhere more strongly to the backing layer than to the substrates, and if the adhesive tape can be elongated sufficiently to reduce its volume between the substrates without breaking or snapping back into its original position, pulling on the tab can release the adhesive layers from both substrates. The adhesive tape can be removed from between the two substrates, the two substrates can be separated, or both.

In some embodiments of the stretch releasable adhesive tape shown schematically in FIG. 1 and FIG. 3, the backing layers 20 as well as both of the adhesive layers 10 and 30 are optically clear. As used herein, the term "optically clear" refers to a backing layer, an adhesive layer, or an adhesive tape that has a luminous transmission of at least 90 percent and a haze no greater than 5 percent in the 400 to 700 nanometer wavelength range. The luminous transmission is often at least 92 percent, at least 94 percent, at least 95 percent, at least 96 percent, at least 97 percent, at least 98 percent, or at least 99 percent. The haze is often no greater than 4, no greater than 3, no greater than 2, or no greater than 1. Both the luminous transmission and the haze can be determined using, for example, ASTM-D 1003-07. Not all materials that are visibly clear are considered to be optically clear. That is, visible clarity is not always synonymous with optical clarity. A material that is visibly clear can have a haze value greater than 5, a luminous transmission value less than 90 percent, or both.

An optically clear, stretch releasable adhesive tape can be positioned between two substrates such that the second substrate is visible when viewed through both the first substrate and the optically clear adhesive tape. If the adhesive tape is optically clear, the second substrate 50 in FIGS. 2 and 3 can be viewed by looking through the first substrate 40 and the adhesive tape (as shown, the adhesive tape corresponds to layers 10, 20 and 30). For example, the optically clear adhesive tape can be used to couple a first substrate such as an optically clear substrate (e.g., a cover lens) to a second substrate such as a display (e.g., a liquid crystal display). If the coupling is not defective, the optically clear adhesive tape remains positioned between the first substrate and the display. If the coupling is defective, however, the adhesive tape can be removed without damaging the display. The adhesive tape can be replaced and the first substrate and the display can be coupled again with another optically clear, stretch releasable adhesive tape.

The backing layer and each pressure-sensitive adhesive layer include an acrylic copolymer. These acrylic copolymers are typically random copolymers that are crosslinked. The first acrylic copolymer included in the backing layer has a different composition than the second acrylic copolymer included in each pressure-sensitive adhesive layer. The backing layer is typically rubbery so that it can be stretched at least 50 percent in a first direction without breaking. That is, the monomers used to prepare the first acrylic copolymer are chosen so that the glass transition temperature (Tg) of this copolymer is typically below room temperature. The backing layer can be tacky or non-tacky. That is, the monomers used to prepare the first acrylic copolymer are chosen without concern for the Dahlquist criterion (i.e., the rubbery plateau modulus can be higher than the Dahlquist number). The second acrylic copolymer, however, tends to have an aggressive and persistent tack. The second acrylic copolymer is usually formulated to exhibit the requisite viscoelastic properties resulting in a desired balance of tack, peel adhesion, and shear holding power. That is, the monomers used to prepare the second acrylic copolymer are chosen to satisfy the Dahlquist criterion (i.e., the rubbery plateau modulus is lower than the Dahlquist number).

The first and second acrylic copolymers are often selected so that the Young's modulus of the pressure-sensitive adhesive layer is less than that of the backing layer. If the Young's modulus of the adhesive layer is less than that of the backing layer, the adhesive layer will yield during the deformation of the backing layer when stretched and the backing layer is less likely to tear. Additionally, the second acrylic copolymer is often selected to have a higher percent elongation at break than the first acrylic copolymer. If this condition is met, the pressure adhesive layer is less likely to leave residue on the substrates upon being released from the substrates.

The backing layer contains a first acrylic copolymer. The first acrylic copolymer is a first polymerized product of a first polymerizable reaction mixture that contains (a) a first crosslinker having at least two (meth)acryloyl groups and (b) either (i) a first monovalent monomer mixture or (ii) a partially polymerized product of the first monovalent monomer mixture. More specifically, the first polymerizable reaction mixture contains (a) a first crosslinker having at least two (meth)acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture. In some embodiments, the backing layer further includes inorganic particles dispersed or suspended in the first acrylic copolymer.

Suitable crosslinkers for preparation of the first acrylic copolymer are compounds with at least two (meth)acryloyl groups. As used herein, the term "(meth)acryloyl" refers to an acryloyl group, a methacryloyl group, or both. Likewise, the term "(meth)acrylate" refers to an acrylate, a methacrylate, or both; the term "(meth)acrylamide" refers to an acrylamide, a methacrylamide, or both; and the term "(meth)acrylic acid" refers to acrylic acid, methacrylic acid, or both. The crosslinkers can be di(meth)acrylates, tri(meth)acrylates, tetra(meth)acrylates, penta(meth)acrylates, and the like. These crosslinkers can be formed, for example, by reacting (meth) acrylic acid with a polyhydric alcohol (i.e., an alcohol having at least two hydroxyl groups). The polyhydric alcohol often has two, three, four, or five hydroxyl groups. Mixtures of crosslinkers can be used.

In many embodiments, the crosslinkers contain at least two acryloyl groups. Exemplary crosslinkers with two acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone. Exemplary crosslinkers with three or four (meth)acryloyl groups include, but are not limited to, trimethylolpropane triacrylate (e.g., commercially available under the trade designation TMPTA-N from Surface Specialties, Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate)triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some embodiments, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking Polymeric crosslinkers tend to be used in greater weight percent amounts compared to their non-polymeric counterparts.

The crosslinker often increases the cohesive strength and the tensile strength of the first acrylic copolymer. The amount of the first crosslinker in the first polymerizable reaction mixture is often selected based on the molecular weight of the crosslinker and the number of reaction sites available for crosslinking. If too much crosslinker is added, however, the resulting first acrylic copolymer can be difficult to stretch for release purposes. The crosslinker is typically present in an amount up to 70 weight percent based on a total weight of polymerizable material in the first polymerizable reaction mixture. The crosslinker can be present in an amount up to 60 weight percent, up to 50 weight percent, up to 40 weight percent, up to 30 weight percent, up to 20 weight percent, or up to 10 weight percent. The amount of the crosslinker is often at least 0.01 weight percent, at least 0.05 weight percent, at least 0.1 weight percent, at least 0.5 weight percent, at least 1 weight percent, at least 2 weight percent, or at least 5 weight percent based on the total weight of polymerizable material in the first polymerizable reaction mixture. If the crosslinker is a non-polymeric material, the amount of the crosslinker if often in the range of 0.01 to 20 weight percent, in the range of 0.01 to 10 weight percent, in the range of 0.01 to 5 weight percent, in the range of 0.01 to 2 weight percent, or in the range of 0.01 to 1 weight percent based on the total weight of polymerizable material in the first polymerizable reaction mixture. If the crosslinker is a polymeric material, however, the amount of the crosslinker is often in the range of 5 to 70 weight percent, in the range of 10 to 70 weight percent, in the range of 20 to 70 weight percent, in the range of 20 to 50 weight percent, or in the range of 40 to 70 weight percent based on the total weight based on the total weight of polymerizable material in the first polymerizable reaction mixture.

In addition to the first crosslinker, the first polymerizable reaction mixture includes a first monovalent monomer mixture or a partially polymerized product of the first monovalent monomer mixture. The monovalent monomer mixture includes both 1) a low Tg yielding acrylic monomer and 2) a first polar monomer. As used herein, the term "monovalent monomer" means that there is only one group in the monomer that is capable of undergoing a free radical polymerization reaction. Monovalent monomers typically have a single ethylenically unsaturated group. A partially polymerized product usually includes the partially polymerized material plus monovalent monomers that have not been polymerized.

As used herein, the term "low Tg yielding acrylic monomer" refers to an acrylic monomer that can be polymerized to form a homopolymer having a glass transition temperature (Tg) that is no greater than 20° C., no greater than 10° C., not greater than 0° C., or no greater than −10° C. Although some polar monomers can be low Tg yielding acrylic monomers, the low Tg yielding acrylic monomers are typically considered to be those that are not polar monomers.

Some suitable low Tg yielding acrylic monomers are alkyl acrylates, aryl substituted alkyl acrylates, or aryloxy substituted alkyl acrylates. Exemplary alkyl acrylates include, but are not limited to, methyl acrylate, ethyl acrylate, n-propyl acrylate, n-butyl acrylate, isobutyl acrylate, n-pentyl acrylate, 2-methylbutyl acrylate, n-hexyl acrylate, cyclohexyl acrylate, 4-methyl-2-pentyl acrylate, 2-ethylhexyl acrylate, 2-methylhexyl acrylate, n-octyl acrylate, isooctyl acrylate, isononyl acrylate, isoamyl acrylate, n-decyl acrylate, isodecyl acrylate, isotridecyl acrylate, isostearyl acrylate, octadecyl acrylate, dodecyl acrylate, and lauryl acrylate. Exemplary aryl substituted alkyl acrylates or aryloxy substituted alkyl acrylates include, but are not limited to, 2-biphenylhexyl acrylate, benzyl acrylate, and 2-phenoxy ethyl acrylate.

The low Tg yielding acrylic monomer tends to facilitate the formation of a first acrylic copolymer that is rubbery (e.g., stretchable). If the amount of the low Tg yielding acrylic monomer is too low, the resulting acrylic copolymer may not be sufficiently rubbery to be stretched for release purposes. That is, the acrylic copolymer may be too stiff to undergo elongation by pulling. The low Tg yielding acrylic monomer is typically present in an amount equal to at least 40 weight percent based on the total weight of polymerizable material in the first polymerizable reaction mixture. The amount of the low Tg yielding acrylic monomer is often at least 50 weight percent, at least 60 weight percent, or at least 70 weight percent. The low Tg yielding acrylic monomer can be present in an amount up to 99 weight percent, up to 95 weight percent, up to 90 weight percent, up to 80 weight percent, or up to 75 weight percent. For example, the amount of the low Tg yielding acrylic monomer can be in the range of 40 to 99 weight percent, in the range of 45 to 95 weight percent, in the range of 45 to 90 weight percent, in the range of 50 to 95 weight percent, in the range of 60 to 95 weight percent, or in the range of 70 to 95 weight percent.

As used herein, the term "polar monomer" refers to a monomer having a single ethylenically unsaturated group and a polar group. The polar group is often a hydroxyl group, a carboxyl group or a salt thereof, a secondary amido group, a tertiary amido group, or an ether group (i.e., a group containing at least one alkylene-oxy-alkylene group of formula —R—O—R— where each R is an alkylene having 1 to 4 carbon atoms). Any suitable salt can be used. In many embodiments, the cation of the salt is an ion of an alkaline metal (e.g., sodium, potassium, or lithium ion), an ion of an alkaline earth (e.g., calcium, magnesium, or strontium ion), an ammonium ion, or an ammonium ion substituted with one or more alkyl or aryl groups.

Exemplary first polar monomers with a hydroxyl group include, but are not limited to, hydroxyalkyl(meth)acrylates (e.g., 2-hydroxyethyl acrylate or 3-hydroxypropyl acrylate), hydroxyalkyl(meth)acrylamides (e.g., 2-hydroxyethyl acrylamide or 3-hydroxypropyl acrylamide), and ethoxylated hydroxyethyl methacrylate (e.g., monomers commercially available from Sartomer under the trade designation CD570, CD571, CD572). Exemplary polar monomers with a carboxyl group include, but are not limited to, acrylic acid, methacrylic acid, and itaconic acid. Exemplary polar monomers with secondary amido groups include, but are not limited to, N-alkyl acrylamides such as N-methyl acrylamide, N-ethyl acrylamide, N-isopropyl acrylamide, tert-octyl acrylamide, or N-octyl acrylamide. Exemplary polar monomers with a tertiary amido group include, but are not limited to, N-vinyl caprolactam, N-vinyl-2-pyrrolidone, acryloyl morpholine, and N,N-dialkyl acrylamides such as N,N-dimethyl acrylamide, N,N-diethyl acrylamide, N,N-dipropyl acrylamide, and N,N-dibutyl acrylamide. Exemplary polar monomers with an ether group include, but are not limited to, alkoxylated alkyl acrylates such as ethoxyethoxyethyl acrylate, 2-methoxyethyl acrylate, and 2-ethoxyethyl acrylate; and poly(alkylene oxide) acrylates such as poly(ethylene oxide) acrylates, and polypropylene oxide) acrylates. The poly(alkylene oxide) acrylates are often referred to as poly (alkylene glycol) acrylates. These monomers can have any suitable end group such as a hydroxyl group or an alkoxy group. For example, when the end group is a methoxy group, the monomer can be referred to as methoxy poly(ethylene glycol) acrylate.

The first polar monomer is often added to enhance adhesion of the backing layer to the pressure-sensitive adhesion layer and to enhance the cohesive strength of the first acrylic copolymer. If too much of the polar monomer is added, however, the acrylic copolymer tends to loose its rubbery character because of the corresponding decrease in the amount of the low Tg yielding acrylic monomer. The first polar monomer is typically present in an amount up to 35 weight percent based on the total weight of polymerizable material in the first polymerizable reaction mixture. The polar monomer is often present in an amount up to 30 weight percent, in an amount up to 25 weight percent, up to 20 weight percent, or up to 15 weight percent. The amount of the polar monomer is often at least 1 weight percent, at least 2 weight percent, at least 3 weight percent, or at least 5 weight percent. The amount of the polar monomer can be, for example, in the range of 1 to 30 weight percent, in the range of 5 to 30 weight percent, in the range of 1 to 25 weight percent, in the range of 5 to 25 weight percent, in the range of 1 to 20 weight percent, or in the range of 5 to 20 weight percent based on the total weight of polymerizable material in the first polymerizable reaction mixture.

The amount of the polar monomer that can be added is somewhat dependent on the particular polar monomer that is used. For example, if the polar monomer is an acidic monomer such as acrylic acid, methacrylic acid, or itaconic acid, the amount added is usually no greater than 25 weight percent, no greater than 20 weight percent, or no greater than 15 weight percent. On the other hand, polar monomers such as vinyl caprolactone, N-vinyl-2-pyrrolidone, N-alkyl acrylamides, alkoxylated alkyl acrylates, and poly(alkylene oxide) acrylates usually can be used in amount up to 35 weight percent.

In some embodiments, the monovalent monomer mixture used to form the backing layer further includes a high Tg yielding acrylic monomer. As used herein, the term "high Tg yielding acrylic monomer" refers to an acrylic monomer that can be polymerized to form a homopolymer having a glass transition temperature that is at least 40° C., at least 50° C., at least 60° C., or at least 80° C. Although some polar monomers can be high Tg yielding acrylic monomers, the high Tg yielding acrylic monomers are typically considered to be those that are not polar monomers. The high Tg yielding acrylic monomer is often selected from monomers such as tert-butyl(meth) acrylate, isobornyl(meth)acrylate, dicyclopenyl acrylate, 3,5-dimethyladamantyl acrylate, 4-biphenyl acrylate, 2-naphtyl acrylate, and phenyl acrylate.

The high Tg yielding acrylic monomer is typically added to enhance the modulus of the backing layer. Compared to using more of the polar monomer, the tensile strength can be increased with a smaller effect on the stiffness of the backing layer. The high Tg yielding acrylic monomer can be present in an amount up to 40 weight percent based on a total weight of polymerizable material in the first polymerizable reaction mixture. The amount of the high Tg yielding acrylic monomer can be up to 35 weight percent, up to 30 weight percent, up to 25 weight percent, or up to 20 weight percent. The high Tg yielding acrylic monomer can be present in an amount equal to at least 1 weight percent, at least 2 weight percent, at least 5 weight percent, or at least 10 weight percent. For example, amount of the high Tg yielding acrylic monomer can be in the range of 1 to 40 weight percent, in the range of 1 to 30 weight percent, in the range of 1 to 20 weight percent, in the range of 5 to 40 weight percent, in the range of 5 to 30 weight percent, in the range of 10 to 40 weight percent, or in the range of 10 to 30 weight percent.

In addition to polymerizable materials, the first polymerizable reaction mixture typically includes an initiator for free radical polymerization of the various polymerizable materials. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material in the first polymerizable reaction mixture.

In some embodiments, a thermal initiator is used. The thermal initiator is typically a peroxide or azo compound. Exemplary peroxides include, but are not limited to, benzoyl peroxide, cyclohexane peroxide, or lauryl peroxide. Exemplary azo compounds include, but are not limited to, 2,2'-azobis(2-methylbutane nitrile) that is commercially available under the trade designation VAZO 67 from DuPont (Wilmington, Del.), 2,2'-azobis(isobutyronitrile) that is commercially available as VAZO 64 from DuPont, and 2,2'-azobis(2,4-dimethylpentane nitrile) that is commercially available as VAZO 52 from DuPont.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from Ciba Corp. (Tarrytown, N.Y.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime.

The backing layer is typically formed from a first precursor composition that includes the first polymerizable reaction mixture. In some embodiments, the backing is prepared from a first precursor composition that includes the first polymerizable reaction mixture plus inorganic particles. The inorganic particles can be added, for example, to increase the cohesive strength of the backing layer. If added, the inorganic particles can be added to the monomer mixture prior to any partial polymerization or can be added after partial polymerization of the monomer mixture.

The inorganic particles can be uniformly or non-uniformly distributed throughout the first precursor composition. Likewise, the inorganic particles can be uniformly or non-uniformly distributed throughout the first acrylic copolymer. The inorganic particles can be metals, metal oxides, or ceramic materials. The inorganic particles are often selected from, but not limited to, alumina, titania, zirconia, silica, or the like.

In many embodiments, the inorganic particles are fumed silica particles. Suitable fumed silica is commercially available under the trade designation AEROSIL (e.g., AEROSIL R972, R974, R976, R300, R380, R130, R150, 8200, R202, R805, and R812) from Evonik Industries (Essen, Germany) or under the trade designation CABOSIL (e.g., CABOSIL TS-720, TS-610, TS-530, and TS-500) from Cabot (Alpharetta, Ga.). The fumed silica can have either a hydrophilic or hydrophobic surface and can have any suitable surface area. For example, the surface area can be in the range of 1 to 500 $m^2$/gram, in the range of 10 to 400 $m^2$/gram, or in the range of 100 to 400 $m^2$/gram.

In other embodiments, the inorganic particles are aerogels such as silica aerogel particles (e.g., crushed aerogels or areogel powder). The silica aerogel particles often have pores in the nanometer range (e.g., less than 100 nanometers or less than 50 nanometers) and have surface areas equal to at least 500 $m^2$/gram. Some exemplary aerogel silica particles have an average particle size that is less than 20 microns or less than 10 microns. Although the size of the silica aerogel particles are larger than the wavelength of light, the particles are often translucent and can be used to form adhesive layers that are relatively clear even though they may not be considered to be optically clear. Exemplary silica aerogel particles in translucent and opacified grades are commercially available under the trade designation NANOGEL from Cabot (Billerica, Mass.).

Although the inorganic particles can be surface modified to facilitate dispersion in the first acrylic copolymer or in the first precursor composition, the inorganic particles are often not surface modified. The inorganic particles can be agglomerated or non-agglomerated and aggregated or non-aggregated. The inorganic particles can have any desired particle size. In embodiments where the adhesive tape is optically clear, the inorganic particles tend to have an average primary particle size that is less than 1000 nanometers, less than 500 nanometers, less than 200 nanometers, less than 100 nanometers, or less than 50 nanometers. In many embodiments, the inorganic particles are nanoparticles having an average primary particle size in the range of 1 to 200 nanometers, in the range of 1 to 100 nanometers, in the range of 1 to 75 nanometers, or in the range of 1 to 50 nanometers. To prepare adhesive tapes that do not need to be optically clear, larger inorganic particles can be used. For example, the inorganic particles can have an average particle size up to 5 micrometers, up to 10 micrometers, up to 20 micrometers, up to 50 micrometers, or up to 100 micrometers.

If added to the backing layer, the inorganic particles can be present in an amount up to 25 weight percent based on the weight of the first acrylic copolymer or based on the total weight of polymerizable material in the first polymerizable reaction mixture. If the amount of the inorganic particles added to the backing layer is too high, the backing layer tends to become too stiff for stretching. Stated differently, the amount of first acrylic copolymer present in the backing layer may become too low to provide suitable elongation upon pulling. The inorganic particles can be present in an amount up to 25 weight percent, up to 20 weight percent, up to 15 weight percent, or up to 10 weight percent. In some embodiments, there is at least 1 weight percent, at least 2 weight percent, at least 5 weight percent, or at least 10 weight percent inorganic particles in the first polymerizable reaction mixture or in the first acrylic copolymer. In some examples the inorganic particles are present in an amount in the range of 1 to 25 weight percent, in the range of 1 to 20 weight percent, in the range of 1 to 15 weight percent, or in the range of 1 to 10 weight percent.

There is typically no solvent added to the first polymerizable reaction mixture. That is, the first polymerizable reaction mixture usually contains only the amount of organic solvent that may be present in the monomers as obtained from a commercial supplier. In some embodiments, the first polymerizable reaction mixture contains no or substantially no organic solvent. As used herein, the terms "substantially no" or "substantially free" with reference to the organic solvent in the first polymerizable reaction mixture means that the organic solvent is present in an amount less than 5 weight percent, less than 4 weight percent, less than 3 weight percent, less than 2 weight percent, or less than 1 weight percent based on the weight of polymerizable materials or polymerized materials.

Some exemplary first precursor compositions contain a first polymerizable reaction mixture but no inorganic particles. The first polymerizable reaction mixture includes (a) a first crosslinker, (b) either (i) a first monovalent monomer mixture or (ii) a partially polymerized product of the first monovalent monomer mixture, and (c) an initiator. The first crosslinker is present in an amount in a range of 0.01 to 70 weight percent. The first monovalent monomer mixture includes a low Tg yielding acrylic monomer in an amount in a range of 40 to 95 weight percent and a first polar monomer in an amount in a range of 1 to 35 weight percent. The initiator is present in an amount in the range of 0.01 to 5 weight percent. Some examples further include a high Tg yielding acrylic monomer in an amount in the range of 1 to 40 weight percent. These weight percent amounts are all based on the total weight of polymerizable material in the first polymerizable reaction mixture. The polymerizable material includes the crosslinker, any monovalent monomers that have not been polymerized, and any partially polymerized material.

In a more specific example of the first precursor composition, the first crosslinker is present in an amount in the range of 0.01 to 20 weight percent and the first monovalent monomer mixture includes the low Tg yielding acrylic monomer present in an amount in the range of 50 to 95 weight percent and the polar monomer is present in an amount in the range of 1 to 20 weight percent. The initiator is present in an amount in the range of 0.01 to 2 weight percent. Some examples further include a high Tg yielding acrylic monomer in an amount in the range of 1 to 20 weight percent. These weight percent values are all based on the total weight of polymerizable material in the first polymerizable reaction mixture.

Other exemplary first precursor compositions contain a first polymerizable reaction mixture and inorganic particles. The first polymerizable reaction mixture includes a first crosslinker and either a first monovalent monomer mixture or a partially polymerized product of the first monovalent monomer mixture. The first crosslinker is present in an amount in a range of 0.01 to 70 weight percent. The first monovalent monomer mixture includes a low Tg yielding acrylic monomer in an amount in a range of 40 to 95 weight percent and a polar monomer in an amount in a range of 1 to 35 weight percent. The initiator is present in an amount in the range of 0.01 to 5 weight percent. Some examples further include a high Tg yielding acrylic monomer in an amount in the range of 1 to 40 weight percent. These weight percent values are all based on the total weight of polymerizable material in the first polymerizable reaction mixture. The inorganic particles are present in an amount in the range of 1 to 25 weight percent based on the weight of polymerizable material in the first polymerizable reaction mixture or based on the weight of the first acrylic copolymer. The polymerizable material includes the crosslinker, any monovalent monomers that have not been polymerized, and any partially polymerized material.

In a more specific example of a first precursor composition that contains inorganic particles, the first crosslinker is present in an amount in the range of 0.01 to 20 weight percent and the first monovalent monomer mixture includes a low Tg yielding acrylic monomer present in an amount in the range of 50 to 95 weight percent and the polar monomer is present in an amount in the range of 1 to 20 weight percent. The initiator is present in an amount in the range of 0.01 to 2 weight percent. These weight percent values are all based on the total weight of polymerizable material in the first polymerizable reaction mixture. The inorganic particles are present in an amount in the range of 1 to 20 weight percent. Some other specific examples further include a high Tg yielding acrylic monomer in an amount in the range of 1 to 20 weight percent based on the weight of polymerizable material in the first polymerizable reaction mixture or based on the weight of the first acrylic copolymer.

The first precursor composition (either with or without optional inorganic particles) is often disposed on a support such as a release liner and then polymerized to form a backing layer. Any method of disposing the first precursor composition on the support can be used. For example, the first precursor composition can be applied as a coating layer on the support using a technique such as knife coating, roll coating, die coating, or extrusion. The coating layer (i.e., first precursor layer) containing the first precursor composition can then be exposed to actinic radiation if a photoinitator is present or to heat if a thermal initiator is present. Exposure to actinic radiation or heat results in the polymerization of non-reacted monomers (e.g., non-reacted ethylenically unsaturated groups) within the first precursor composition.

In some embodiments, prior to disposition of the first precursor composition on a support, some of the polymerizable materials (e.g., some of the monovalent monomers in the first polymerizable reaction mixture) are partially polymerized to increase the viscosity of the mixture. That is, the viscosity is increased to form a syrup-like material that can be handled more easily to form a first precursor layer. Often, the monovalent monomers such as the low Tg yielding acrylic monomer and the polar monomer are mixed with a portion of the initiator. Depending on the type of initiator added, the mixture is exposed to actinic radiation or heat to partially polymerize the monovalent monomers. Then, the crosslinker and any remaining portion of the initiator are added to the partially polymerized product. If inorganic particles are included in the first precursor composition, they can be added either before or after partial polymerization of the monovalent monomers. The resulting first precursor composition can then be disposed on a support as a coating layer. The coating layer (i.e., first precursor layer) can then be exposed to actinic radiation if a photoinitator is present or to heat if a thermal initiator is present. Exposure to actinic radiation or heat results in the polymerization of non-reacted monomers or non-reacted ethylenically unsaturated groups within the first precursor composition.

The polymerization reactions to form the backing layer (e.g., the first acrylic copolymer) are often performed in an inert environment (e.g., nitrogen, helium, argon, carbon dioxide, or the like) or in an environment free or substantially free of air or oxygen. For example, the first precursor composition can be purged of air and oxygen using an inert gas such as nitrogen, carbon dioxide, or argon. In other examples, the polymerization reactions can be performed while the first precursor composition is positioned between two other layers such as between two release liners. These additional layers (e.g., release liners) can function to minimize exposure to air or oxygen during the polymerization reactions.

The thickness of the backing layer is often selected based on the desired stretch release force. A greater stretch release force is usually needed as the thickness of the backing layer is increased. Conversely, a lower stretch release force is needed as the thickness of the backing layer is decreased. The thickness of the backing layer can be, for example, up to 40 mils (1.0 millimeter or 1000 micrometers). As used herein, the term "mil" refers to 0.001 inch and 1 mil is equal to about 0.0025 centimeters or about 0.025 millimeters or about 25 micrometers. In many embodiments, the thickness is up to 30 mils (750 micrometers), up to 20 mils (500 micrometers), up to 10 mils (250 micrometers), up to 8 mils (200 micrometers), up to 6 mils (150 micrometers), or up to 5 mils (125 micrometers). The thickness is often at least 1 mil (0.025 millimeters or 25 micrometers), at least 2 mils (50 micrometers), at least 3 mils (75 micrometers), or at least 4 mils (100 micrometers). Some suitable backing layers have a thickness in the range of 1 mil (25 micrometers) to 20 mils (500 micrometers), in the range of 1 mil (25 micrometers) to 10 mils (250 micrometers), in the range of 1 mil (25 micrometers) to 8 mils (200 micrometers), in the range of 1 mil (25 micrometers) to 7 mils (175 micrometers), in the range of 2 mils (50 micrometers) to 8 mils (200 micrometers), in the range of 3 mils (75 micrometers) to 6 mils (150 micrometers), or in the range of 4 mils (100 micrometers) to 5 mils (125 micrometers).

The backing layer as well as the adhesive tape containing the backing layer can be stretched (elongated) in a first direction (e.g., a lengthwise direction) at least 50 percent without breaking. In some embodiments, the backing layer and the adhesive tape containing the backing layer can be stretched at least 100 percent, at least 150 percent, at least 200 percent, at least 300 percent, at least 400 percent, or at least 500 percent without breaking. The backing layer and the adhesive tape containing the backing layer can often be stretched up to 3000 percent or even higher, up to 1200 percent, up to 1000 percent, up to 800 percent, up to 750 percent, or up to 700 percent without breaking. These relatively large elongation values facilitate stretch releasing of the adhesive tape after being adhered to a substrate.

The Young's Modulus of the backing layer can be an indicator of the resistance of the backing layer to stretching. The Young's Modulus is often in the range of about 10 MPa to about 75 MPa. For example, the Young's Modulus can be in the range of 20 to 75 MPa, in the range of 20 to 60 MPa, in the range of 20 to 50 MPa, or in the range of 25 to 50 MPa. The Young's Modulus can be measured using method ASTM D790-07 or ASTM D882-02.

The tensile strength of the backing layer is an indicator of the load that the backing layer can sustain without breaking and is an indicator of how far the backing layer can be stretched without breaking. The tensile strength is typically in the range of about 10 MPa to about 60 MPa or higher. For example, the tensile strength can be in the range of 10 to 60 MPa, in the range of 10 to 50 MPa, in the range of 20 to 60 MPa, in the range of 20 to 55 mPa, or in the range of 25 to 50 MPa. The tensile strength can be measured using method ASTM D882-02.

A pressure-sensitive adhesive layer is positioned adjacent to at least one major surface of the backing layer. In many embodiments, a first pressure-sensitive adhesive layer is positioned adjacent to a first major surface of the backing layer and a second pressure-sensitive adhesive layer is positioned adjacent to a second major surface of the backing layer. The second major surface of the backing layer is the surface opposite the first major surface. Each pressure-sensitive adhesive layer is adhered directly or indirectly (e.g., adhered through an intervening primer layer) to the backing layer. Each pressure-sensitive adhesive layer includes a second acrylic copolymer that is different than the first acrylic copolymer included in the backing layer. The second acrylic copolymer included in each pressure-sensitive adhesive layers is often itself a pressure-sensitive adhesive without the addition of a tackifier. However, the tackiness of each pressure-sensitive adhesive layer can be enhanced by addition of a tackifier.

The at least one pressure-sensitive adhesive layer is formed from a second precursor composition that contains a second polymerizable reaction mixture and inorganic particles. The second polymerizable reaction mixture includes (a) a second crosslinker having at least two (meth)acryloyl groups and (b) either (i) a second monovalent monomer mixture comprising an alkyl(meth)acrylate with an alkyl group having at least 4 carbon atoms and a second polar monovalent monomer having an ethylenically unsaturated group or (ii) a partially polymerized product of the second monovalent monomer mixture. The polymerized product of the second polymerizable reaction mixture is a second acrylic copolymer that is different than the first acrylic copolymer included in the backing layer. Inorganic particles are included in the second precursor composition and are dispersed or suspended in the second acrylic copolymer.

More specifically, the second polymerizable reaction mixture includes (a) a second crosslinker having at least two (meth)acryloyl groups in an amount up to 25 weight percent based on a total weight of polymerizable material in the second polymerizable reaction mixture and (b) either (i) a second monovalent monomer mixture comprising 1) an alkyl (meth)acrylate with an alkyl group having at least 4 carbon atoms in an amount equal to at least 40 weight percent based on the total weight of polymerizable material in the second polymerizable reaction mixture and 2) a second polar monovalent monomer in an amount up to 40 weight percent based on the total weight of polymerizable material in the second polymerizable reaction mixture or (ii) a partially polymerized product of the second monovalent monomer mixture. A partially polymerized product usually includes the partially polymerized material plus monovalent monomers that have not been polymerized. Inorganic particles are present in an amount up to 25 weight percent based on the weight of the polymerizable material in the second polymerizable reaction mixture or based on the weight of the second acrylic copolymer, which is the polymerized product of the second polymerizable reaction mixture.

The second polymerizable reaction mixture includes a second crosslinker. Suitable crosslinkers can be the same as those used in the first polymerizable reaction mixture to form the backing layer. However, in many embodiments, the second crosslinker has an average molecular weight that is less than 500 grams/mole. That is, the second crosslinker is usually a non-polymeric material rather than polymeric material. Further, the second crosslinker often has two to four (meth) acryloyl groups. In many examples, the (meth)acryloyl groups are acryloyl groups. Exemplary second crosslinkers include, but are not limited to, 1,2-ethanediol diacrylate, 1,9-nonanediol diacrylate, 1,12-dodecanediol diacrylate, 1,3-propanediol diacrylate, 1,4-butanediol diacrylate, 1,6-hexanediol diacrylate, bisphenol A diacrylate, diethylene glycol diacrylate, triethylene glycol diacrylate, tetraethlyene glycol diacrylate, tripropylene glycol diacrylate, neopentylglycol hydroxypivalate diacrylate modified caprolactone, trimethylolpropane triacrylate, pentaerythritol triacrylate, pentaerythritol tetraacrylate, and mixtures thereof.

The second crosslinker is typically added for cohesive reinforcement of the pressure-sensitive adhesive layer. An adhesive layer with good cohesive strength is less likely to leave a residue on the surface of a substrate when the adhesive tape is stretch for removal from the substrate. If too much crosslinker is added, however, the layer tends to become less compliant and may not function as a pressure-sensitive adhesive. The amount of the second crosslinker in the second polymerizable reaction mixture is often selected based on the molecular weight of the crosslinker and the number of reaction sites available for crosslinking. The second crosslinker is often present in an amount up to 25 weight percent based on the total weight of polymerizable material in the second polymerizable reaction mixture. The amount of the second crosslinking is often up to 20 weight percent, up to 15 weight percent, up to 10 weight percent, or up to 5 weight percent based on the total weight of the monomers in the second polymerizable reaction mixture. The second crosslinker can be present in an amount equal to at least 0.01 weight percent, at least 0.02 weight percent, at least 0.05 weight percent, at least 0.1 weight percent, at least 0.2 weight percent, at least 0.5 weight percent, at least 0.75 weight percent, at least 1 weight percent, or at least 2 weight percent. In some examples, the crosslinker in the second polymerizable reaction mixture is present in an amount in the range of 0.01 to 25 weight percent, in the range of 0.01 to 15 weight percent, in the range of 0.01 to 10 weight percent, in the range of 0.01 to 5 weight percent, in the range of 0.05 to 5 weight percent, in the range of 0.1 to 5 weight percent, in the range of 0.01 to 2 weight percent, in the range of 0.1 to 2 weight percent, or in the range of 0.01 to 1 weight percent based on the total weight of the polymerizable material in the second polymerizable reaction mixture.

In addition to the second crosslinker, the second polymerizable reaction mixture includes either (i) a second monovalent monomer mixture or (ii) a partially polymerized product of the second monovalent monomer mixture. The second monovalent monomer mixture includes both 1) an alkyl (meth)acrylate having at least 4 carbon atoms and 2) a second polymer monomer having an ethylenically unsaturated group.

The alkyl(meth)acrylate in the second monovalent monomer mixture is usually added to control the glass transition temperature (Tg) and the storage modulus of the second acrylic copolymer. To provide a pressure-sensitive adhesive layer, the Tg of the second acrylic copolymer is usually less than room temperature (e.g., less than 25° C. or less than 20° C.) and the storage modulus is below the Dahlquist criterion.

The alkyl(meth)acrylate is often an alkyl acrylate. The alkyl acrylate can be the reaction product of acrylic acid with a monohydric alcohol. The alcohol is usually not a tertiary alkyl alcohol. Suitable alkyl(meth)acrylate monomers often have an alkyl group with at least 4 carbon atoms, at least 6 carbon atoms, or at least 8 carbon atoms. For example, the alkyl group of the alkyl(meth)acrylate often has 4 to 20 carbon atoms, 4 to 18 carbon atoms, 4 to 16 carbon atoms, 4 to 14 carbon atoms, 4 to 12 carbon atoms, or 4 to 10 carbon atoms. The alkyl group of the alkyl(meth)acrylate can be linear, cyclic, or a combination thereof and can be optionally substituted with an aryl group such as a phenyl. Exemplary alkyl(meth)acrylates include, but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamyl acrylate, n-decyl acrylate, isodecyl acrylate, isobornyl acrylate, 4-methyl-2-pentyl acrylate, and dodecyl acrylate. There are often more than one alkyl(meth)acrylate monomers included in the second polymerizable reaction mixture used to form the pressure-sensitive adhesive layer. For example, the second polymerizable reaction mixture can contain two, three, four, or even more alkyl(meth)acrylates monomers with an alkyl group having at least 4 carbon atoms.

The alkyl(meth)acrylate monomer is often present in an amount equal to at least 40 weight percent based on the total weight of polymerizable material in the second polymerizable reaction mixture. For example, the alkyl(meth)acrylate monomer can be present in an amount equal to at least 50 weight percent, at least 60 weight percent, at least 70 weight percent, at least 75 weight percent, or at least 80 weight percent based on the weight of polymerizable material in the second polymerizable reaction mixture. The amount of the alkyl(meth)acrylate can be up to 99 weight percent, up to 95 weight percent, up to 90 weight percent, up to 85 weight percent, or up to 80 weight percent based on the weight of polymerizable material in the second polymerizable reaction mixture. In some examples, the alkyl(meth)acrylate monomer is present in an amount in the range of 40 to 99 weight percent, in the range of 50 to 99 weight percent, in the range of 50 to 95 weight percent, in the range of 60 to 95 weight percent, in the range of 60 to 90 weight percent, in the range of 70 to 95 weight percent, or in the range of 70 to 90 weight percent.

The second polar monomer in the second monovalent monomer mixture is usually added to enhance adhesion to the backing layer, to provide adhesion to substrates having polar surfaces, and to increase the cohesive strength of the pressure-sensitive adhesive layer. Exemplary second polar monomers that can be included in the second monovalent monomer mixture are of the same as those described above for use in the first monovalent monomer mixture. The second polar monomer can be present in an amount up to 40 weight percent based on the total weight of polymerizable material in the second polymerizable reaction mixture. In many embodiments, the second polar monomer is present in an amount up to 35 weight percent, up to 30 weight percent, up to 20 weight percent, up to 15 weight percent, or up to 10 weight percent. The second polymerizable reaction mixture often contains at least 1 weight percent, at least 2 weight percent, at least 3 weight percent, or at least 5 weight percent of the second polar monomer. The second polar monomer can be present, for example, in the range of 1 to 40 weight percent, in the range of 1 to 35 weight percent, in the range of 1 to 30 weight percent, in the range of 1 to 25 weight percent, in the range of 1 to 20 weight percent, in the range of 1 to 15 weight percent, in the range of 2 to 15 weight percent, in the range of 5 to 20 weight percent, or in the range of 5 to 15 weight percent based on a total weight of polymerizable material in the second polymerizable reaction mixture.

The amount of the polar monomer that can be added to the second monomer mixture is somewhat dependent on the particular polar monomer that is used. For example, if the polar monomer is an acidic monomer such as acrylic acid, methacrylic acid, or itaconic acid, the amount added is usually no greater than 15 weight percent, no greater than 10 weight percent, or no greater than 5 weight percent. On the other hand, polar monomer such as vinyl caprolactone, N-vinyl-2-pyrrolidone, N-alkyl acrylamides, alkoxylated alkyl acrylates, and poly(alkylene oxide) acrylates usually can be used in amount up to 40 weight percent.

The second polymerizable reaction mixture usually further includes a free radical polymerization initiator. Any known initiators for free radical polymerization reactions can be used. The same initiators and amounts described for use in the first polymerizable reaction mixture can be included in the second polymerizable reaction mixture.

Each pressure-sensitive adhesive layer contains inorganic particles suspended or dispersed in the second acrylic copolymer, which is the polymerized product of the second polymerizable reaction mixture. The addition of the inorganic particles to the pressure-sensitive adhesive layer tend to increase the cohesive strength of this layer and to increase the rubbery plateau modulus. Surprisingly, the addition of the inorganic particles decreases the residue left on the substrate when the adhesive tape is stretched for removal. That is, the tackiness of the adhesive layer tends to decrease with stretching in the presence of the inorganic particles.

The same type and amount of inorganic particles described for use in the backing layer can be used in each pressure-sensitive adhesive layer. In many embodiments, the inorganic particles are silica such as fumed silica or silica aerogel particles. The inorganic particles can be added to and combined with the second polymerizable reaction mixture using any suitable method.

The pressure-sensitive adhesive layer can include, for example, up to 25 weight percent inorganic particles based on the total weight of polymerizable material in the second polymerizable reaction mixture or based on the weight of the second acrylic copolymer. For example, pressure-sensitive adhesive layer can contain up to 20 weight percent, up to 15 weight percent, up to 10 weight percent, or up to 5 weight percent inorganic particles. The pressure-sensitive adhesive layer often includes at least 1 weight percent, at least 2 weight percent, at least 5 weight percent, or at least 10 weight percent of inorganic particles. For example, the amount of inorganic particles can be in the range of 1 to 25 weight percent, in the range of 1 to 20 weight percent, in the range of 2 to 20 weight percent, in the range of 1 to 15 weight percent, 1 to 10 weight percent, or in the range of 2 to 10 weight percent based on the total weight of polymerizable material in the second polymerizable reaction mixture or based on the weight of the second acrylic copolymer.

Although the second acrylic copolymer formed by polymerization of the second polymerizable reaction mixture is typically a pressure-sensitive adhesive material, a tackifier can be added to the second precursor composition (i.e., the second precursor composition can include the second polymerizable reaction mixture, inorganic particles, and a tackifier). Any tackifier typically included in pressure-sensitive adhesive compositions can be used. Either solid or liquid tackifiers can be added. Solid tackifiers generally have a number average molecular weight (Mn) of 10,000 grams per mole or less and a softening point above about 70° C. Liquid tackifiers are viscous materials that have a softening point of about 0° C. to about 70° C. Solid tackifying resins are generally preferred.

Suitable tackifying resins include rosins and their derivatives (e.g., rosin esters); polyterpenes and aromatic-modified polyterpene resins; coumarone-indene resins; and hydrocarbon resins, for example, alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. These tackifying resins, if added, are often hydrogenated to lower their color contribution to the pressure-sensitive adhesive layer.

If added, the tackifier is often present in an amount up to about 40 weight percent based on the total weight of polymerizable material in the second polymerizable reaction mixture. The tackifier can be present, for example, in an amount up to 35 weight percent, up to 30 weight percent, up to 25 weight percent, up to 20 weight percent, up to 15 weight percent, or up to 10 weight percent. Some second precursor compositions contain 1 to 40 weight percent, 5 to 40 weight percent, 10 to 40 weight percent, or 5 to 30 weight percent tackifier.

There is typically no solvent added to the second polymerizable reaction mixture. That is, the second polymerizable reaction mixture usually contains only the amount of organic solvent that may be present in the monomers as obtained from a commercial supplier. In some embodiments, the second polymerizable reaction mixture contains no or substantially no organic solvent. As used herein, the terms "substantially no" or "substantially free" with reference to the organic solvent in the second polymerizable reaction mixture means that the organic solvent is present in an amount less than 5 weight percent, less than 4 weight percent, less than 3 weight percent, less than 2 weight percent, or less than 1 weight percent based on the weight of polymerizable materials or polymerized materials.

The second precursor compositions contain the second polymerizable reaction mixture and inorganic particles. The second polymerizable reaction mixture includes (a) a second crosslinker and (b) either (i) a second monovalent monomer mixture or (ii) a partially polymerized product of the second monovalent monomer mixture. Some exemplary second precursor compositions contain the second crosslinker in an amount in a range of 0.01 to 25 weight percent. The second monovalent monomer mixture often includes a) an alkyl (meth)acrylate in an amount in a range of 40 to 99 weight percent and b) a polar monomer in an amount in a range of 1 to 40 weight percent. The initiator is often present in an amount in the range of 0.01 to 5 weight percent. The inorganic particles are often present in an amount in the range of 1 to 25 weight percent. These weight percent values are all based on the total weight of polymerizable material in the second polymerizable reaction mixture. The polymerizable material includes the crosslinker, any monovalent monomers that have not been polymerized, and any partially polymerized material.

In a more specific example of the second precursor composition, the second crosslinker is present in an amount in the range of 0.01 to 10 weight percent and the second monovalent monomer mixture includes an alkyl(meth)acrylate in an amount in the range of 60 to 95 weight percent and a polar monomer is present in an amount in the range of 5 to 20 weight percent. The initiator is present in an amount in the range of 0.01 to 2 weight percent. The inorganic particles are present in an amount in the range of 1 to 20 weight percent. These weight percent values are all based on the total weight of polymerizable material in the second polymerizable reaction mixture.

This second precursor composition can be disposed on a support or another layer and then polymerized to form a pressure-sensitive adhesive layer. Any method of disposing the second precursor composition on the support such as a release liner or another layer such as a backing layer can be used. For example, the second precursor composition can be applied as a coating layer on the support or another layer using a technique such as knife coating, die coating, or extrusion. The coating layer (i.e., second precursor layer) containing the second precursor composition then can be exposed to actinic radiation if a photoinitator is present or to heat if a thermal initiator is present. Exposure to actinic radiation or heat results in the polymerization of any remaining polymerizable material (i.e., polymerization of non-reacted ethylenically unsaturated groups) within the second precursor composition.

In some embodiments, prior to disposition of the second precursor composition on a support (e.g., release liner) or another layer (e.g., backing layer), some of the monomers included in the second polymerizable reaction mixture are partially polymerized to increase the viscosity of the second polymerizable reaction mixture. The viscosity is often increased to that corresponding to a syrup-like material. Often, the monovalent monomers such as the alkyl(meth) acrylate monomer and the polar monomer are mixed with a portion of the free radical polymerization initiator. Depending on the type of initiator added, the mixture is exposed to actinic radiation or heat to partially polymerize the monovalent monomers. Then, the crosslinker and any remaining portion of the initiator are added to the partially polymerized product. The inorganic particles in the second precursor composition can be added either before or after partial polymerization of the monovalent monomers. The resulting second precursor composition can then be disposed as a coating layer (i.e., second precursor layer). The coating layer can then be exposed to actinic radiation if a photoinitator is present or to heat if a thermal initiator is present. Exposure to actinic radiation or heat results in the reaction of polymerizable material within the second precursor composition.

Any suitable thickness can be used for the pressure-sensitive adhesive layer or layers. In many embodiments, each pressure-sensitive adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness of the pressure-sensitive adhesive layer is often at least 0.5 mils (12.5 micrometers) or at least 1 mil (25 micrometers). For example, the thickness of the pressure-sensitive adhesive layer can be in the range of 0.5 mils (2.5 micrometers) to 10 mils (250 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The adhesive tape, which contains a backing layer and at least one pressure-sensitive adhesive layer, can be formed in any suitable manner. In some embodiments, the backing layer is prepared separately from the pressure-sensitive adhesive layer. After preparation of the backing layer, at least one separately formed pressure-sensitive adhesive layer can be laminated to a major surface of the backing layer. Often a first pressure-sensitive adhesive layer is laminated to a first major surface of the backing layer and a second pressure-sensitive adhesive layer is laminated to a second major surface (i.e., opposite the first major surface) of the backing layer. That is, the adhesive tape arranged in the following order: first pressure-sensitive adhesive layer—backing layer—second pressure-sensitive adhesive layer.

This construction is often prepared by laminating a backing layer that is supported by a release liner for the backing to a first pressure-sensitive adhesive layer that is supported by a first release liner. Lamination is typically accomplished by applying pressure to the resulting structure: first release liner—first pressure-sensitive adhesive layer—backing layer—release liner for backing layer. After lamination, the release liner for the backing layer is removed and the exposed backing layer is laminated to a second pressure-sensitive adhesive layer that is supported on a second release liner. Again, lamination is typically accomplished by applying pressure to the resulting structure: first release liner—first pressure-sensitive adhesive layer—backing layer—second pressure-sensitive adhesive layer—second release liner.

In other embodiments, the backing layer is prepared as a sheet and then the second precursor composition is applied to at least one surface of the previously formed backing layer. That is, the backing layer functions as the support for the deposition of the second precursor composition. The second precursor composition is polymerized to form a first pressure-sensitive adhesive layer while in contact with the backing layer. If the adhesive tape has two pressure-sensitive adhesive layers, the second pressure-sensitive adhesive layer can be positioned adjacent to the other major surface (i.e., second major surface) of the backing layer by lamination of a separately formed pressure-sensitive adhesive layer. Alternatively, another second precursor composition can be applied to the other major surface of the backing layer and polymerized to form the second pressure-sensitive layer while in contact with the backing layer. In this alternative embodiment, the first pressure-sensitive adhesive layer is often positioned adjacent to a first release liner.

The polymerization reactions used to form the at least one pressure-sensitive adhesive layer from the second precursor composition are often performed in an inert environment (e.g., nitrogen, helium, argon, carbon dioxide, or the like) or in an environment free or substantially free of air or oxygen. For example, the precursor composition can be purged of air and oxygen using an inert gas. Alternatively, the polymerization and crosslinking reactions can be performed while the precursor composition is positioned between two surfaces such as between the backing layer and a release liner. The two other surfaces function to minimize exposure to air or oxygen during the polymerization reactions.

In still other embodiments, the precursor of the backing layer (i.e., the first precursor composition) is disposed adjacent to the precursor for the pressure-sensitive adhesive layer (i.e., the second precursor composition) and the precursor layers are subsequently cured (i.e., polymerized and/or crosslinked). The curing of the first precursor composition and the curing of the second precursor composition can be sequential or concurrent. In a sequential arrangement, a layer of the first precursor composition can be cured to form the backing layer and then coated with the second precursor composition that is subsequently cured to form the first pressure-sensitive adhesive layer. In a concurrent arrangement, both layers can be disposed (e.g., extruded or coated) onto a support such as a release liner and cured at the same time. Either the concurrent arrangement or the sequential arrangement can be done in a continuous process.

If the adhesive tape contains two pressure-sensitive adhesive layers, three precursor compositions can be extruded adjacent to each other and cured simultaneously. For example, the first precursor composition can be positioned between two second precursor compositions using an extrusion method. One of the second precursor layers can be adjacent to a support such as release liner. A second release liner can be positioned adjacent the other second precursor composition. The three layers can be cured simultaneously by exposure to heat or actinic radiation. The resulting cured structure includes an adhesive tape between two release liners and arranged in the following order: first release liner—first pressure-sensitive adhesive layer—backing layer—second pressure-sensitive adhesive layer—second release liner.

The various layers in the adhesive tape are often cured using actinic radiation (i.e., the various precursor compositions include a photoinitiator). Suitable actinic radiation includes electromagnetic radiation in the infrared region, visible region, ultraviolet region, or a combination thereof. The photoinitiator is often activated by exposure to ultraviolet light. Any source of ultraviolet light known in the art can be used. Suitable ultraviolet light sources include, but are not limited to, mercury arcs, low-pressure mercury lamps, medium-pressure mercury lamps, high-pressure mercury lamps, plasma arcs, ultraviolet backlights, ultraviolet light emitting diodes, and ultraviolet light emitting lasers. Often, light sources having a lower light intensity are preferred.

In a more specific exemplary method, the adhesive tape can be prepared by providing a first precursor layer that contains a first precursor composition, providing a second precursor layer that contains a second precursor composition that is positioned adjacent to a first major surface of the first precursor layer, and providing a third precursor layer that contains the second precursor composition that is positioned adjacent to a second major surface of the first precursor layer. That is, both the second precursor layer and the third precursor layer contain the second precursor composition. The method further includes exposing the first precursor layer, the second precursor layer, and the third precursor layer to actinic radiation to polymerize the first precursor layer to form a backing layer comprising a first acrylic copolymer, to polymerize the second precursor layer to form a first pressure-sensitive adhesive layer comprising a second acrylic copolymer and inorganic particles dispersed or suspended in the second acrylic copolymer, and to polymerize the third precursor layer to form a second pressure-sensitive adhesive layer comprising the second acrylic copolymer and inorganic particles dispersed or suspended in the second acrylic copolymer. The first precursor composition includes a first polymerizable reaction mixture that contains (a) a first crosslinker having at least two (meth)acryloyl groups in an amount up to 70 weight percent based on a total weight of polymerizable material in the first polymerizable reaction mixture, (b) either (i) a first monovalent monomer mixture containing 1) a low Tg yielding acrylic monomer in an amount equal to at least 40 weight percent based on the total weight of polymerizable material in the first polymerizable reaction mixture and 2) a first polar monomer in an amount up to 35 weight percent based on the total weight of polymerizable material in the first polymerizable reaction mixture or (ii) a partially polymerized product of the first monovalent monomer mixture, and (c) a first photoinitiator in an amount up to 5 weight percent based on the weight of polymerizable material in the first polymerizable reaction mixture. Each second precursor composition includes a second polymerizable reaction mixture and inorganic particles. The second polymerizable reaction mixture contains (a) a second crosslinker having at least two (meth) acryloyl groups in an amount up to 25 weight percent based on a total weight of polymerizable material in the second polymerizable reaction mixture, (b) either (i) a second monovalent monomer mixture that contains 1) a second alkyl (meth)acrylate having an alkyl group with at least 4 carbon atoms in an amount equal to at least 40 weight percent based on the weight of polymerizable material in the second polymerizable reaction mixture and 2) a second polar monomer in an amount up to 40 weight percent based on the weight of polymerizable material in the second polymerizable reaction mixture or (ii) a partially polymerized product of the second monovalent monomer mixture, and (c) a second photoinitiator in an amount up to 5 weight percent based on the weight of polymerizable material in the second polymerizable reaction mixture. In this method, the three layers (e.g., first precursor layer, second precursor layer, and third precursor layer) are often cured simultaneously with the actinic radiation. However, one or two layers can be cured prior to application and curing of any remaining layer or layers.

If two precursor compositions are positioned adjacent to each other prior to curing, the viscosity of each layer should be sufficiently high to minimize diffusion of one precursor composition into that of the other. Diffusion tends to alter the composition of each layer. It is often desirable to maintain the composition of each layer because that composition is selected to provide a different function. However, some diffusion between the layers may be desirable for interlayer adhesion.

Any suitable release liner can be used to prepare the adhesive tape or to temporarily protect an adhesive layer. Suitable release liners include paper (e.g., Kraft paper) and polymeric films. In many applications, polymeric films are preferred. The polymeric films used as release liners can be formed, for example, from polyester such as polyethylene terephthalate or polyolefins such as polyethylene, polypropylene, or combinations thereof. The surface of some release liners can be treated with a release agent such as silicone, a fluorochemical such as a fluorosilicone, or other low surface energy materials. Suitable release liners and methods for treating liners are further described in, for example, U.S. Pat. Nos. 4,472,480 (Olson), 4,980,443 (Kendziorski), and 4,736,048 (Brown et al.).

In some embodiments, it may be desirable to impart a microstructured surface to the outer surface of a pressure-sensitive adhesive layer (i.e., the surface of the pressure-sensitive adhesive layer opposite the backing layer). Microstructured surfaces tend to facilitate air egress during lamination. If it is desired to have a microstructured surface on the pressure-sensitive adhesive layer, this layer can be formed while in contact with a tool or a liner (e.g., a release liner) containing microstructured features. After curing the precursor composition to form the pressure-sensitive adhesive layer, the liner or tool can then be removed to expose an adhesive film having a microstructured surface. Generally with optical applications it is desirable that the microstructures disappear over time to prevent interference with optical properties.

In many embodiments, the adhesive tape is a dual sided adhesive tape. As prepared, the adhesive tape often has a first release liner adjacent to the first pressure-sensitive adhesive layer and a second release liner adjacent to the second pressure-sensitive adhesive layer. To use the adhesive tape, each release liner can be removed to expose the pressure adhesive layer for adhering to another surface such as a substrate. The backing layer often directly contacts the first and second pressure-sensitive adhesive layers. Alternatively, the backing layer can be separated from the pressure-sensitive adhesive layers with another layer such as a primer layer.

In another aspect, an article is provided. In one embodiment, the article includes a first substrate, a second substrate, and an adhesive tape positioned between the first substrate and the second substrate. The adhesive tape couples the first substrate to the second substrate. The adhesive tape includes (A) a backing layer, (B) a first pressure-sensitive adhesive layer that is adjacent to a first major surface of the backing layer and a second pressure-sensitive adhesive layer that is adjacent to a second major surface of the backing layer, and (C) a tab that extends beyond at least one of the first substrate and the second substrate. Pulling the tab stretches the adhesive tape and releases the adhesive tape from the first substrate, from the second substrate, or from both the first substrate and the second substrate. The adhesive tape can be stretched at least 50 percent in a first direction without breaking. The backing layer contains a first acrylic copolymer. The first acrylic copolymer in the backing layer is a first polymerized product of a first polymerizable reaction mixture that contains (a) a first crosslinker having at least two (meth) acryloyl groups in an amount up to 70 weight percent based on a total weight of polymerizable material in the first polymerizable reaction mixture and (b) either (i) a first monovalent monomer mixture containing 1) a low Tg yielding acrylic monomer in an amount equal to at least 40 weight percent based on the total weight of polymerizable material in the first polymerizable reaction mixture and 2) a polar monomer in an amount up to 35 weight percent based on the total weight of polymerizable material in the first polymerizable reaction mixture or (ii) a partially polymerized product of the first monovalent monomer mixture. The first pressure-sensitive adhesive layer and the second pressure adhesive layer each contains (1) a second acrylic copolymer that is different than the first acrylic copolymer and (2) inorganic particles suspended or dispersed in the second acrylic copolymer in an amount up to 25 weight percent based on the weight of the second acrylic copolymer. The second acrylic copolymer is a second polymerized product of a second polymerizable reaction mixture that contains (a) a second crosslinker having at least two (meth)acryloyl groups in an amount up to 25 weight percent based on a total weight of polymerizable material in the second polymerizable reaction mixture and (b) either (i) a second monovalent monomer mixture containing 1) an alkyl (meth)acrylate having an alkyl group with at least 4 carbon atoms in an amount equal to at least 40 weight percent based on the total weight of polymerizable material in the second polymerizable reaction mixture and 2) a second polar monomer in an amount up to 40 weight percent based on the total weight of polymerizable material in the second polymerizable reaction mixture or (ii) a partially polymerized product of the second monovalent monomer mixture.

In a second embodiment, the article includes a first substrate and an adhesive tape adhered to the first substrate. The adhesive tape includes (A) a backing layer, (B) a first pressure-sensitive adhesive layer that is adjacent to a first major surface of the backing layer and (C) a tab that extends beyond at least one of the first substrate and the second substrate. Pulling the tab stretches the adhesive tape and releases the adhesive tape from the first substrate, from the second substrate, or from both the first substrate and the second substrate. The adhesive tape can be stretched at least 50 percent in a first direction without breaking. The backing layer and the first pressure-sensitive adhesive layer are the same as described above.

In these embodiments, each pressure-sensitive adhesive layer includes inorganic particles. The backing layer can optionally include inorganic particles. Any suitable substrates can be adhered to each pressure-sensitive adhesive layer. The substrates can provide any desired function, can be formed from any suitable material, can have any desired flexibility or rigidity, and can have any desired size, shape, thickness, and aspect ratio. The substrate can be a single layer or can include multiple layers of material such as a support layer, a primer layer, a hard coat layer (e.g., acrylic or polyurethane), a decorative design, or the like. Either substrate or both substrates can be an outer surface layer of another article. Either substrate or both substrates can contain any suitable material such as a polymeric material, glass material, ceramic material, metal-containing material (e.g., metal or metal oxide or metal alloy), or a combination thereof.

Exemplary metal, metal oxide, or metal alloy for use in a substrate include, but are not limited to, indium tin oxide, titanium, nickel, steel, aluminum, copper, zinc, iron, cobalt, silver, gold, platinum, lead, and the like. These materials can be a conductive or insulating material. Representative examples of polymeric materials useable in a substrate include polycarbonates, polyesters (e.g., polyethylene terephthalates and polyethylene naphthalates), polyurethanes, poly(meth)acrylates (e.g., polymethyl methacrylates), polyvinyl alcohols, polyvinyl chloride, polyolefins such as polyethylenes, polypropylenes, or poly(cyclic olefins) such as polynorbornene, polyvinyl chlorides, polyimides, cellulose triacetates, acrylonitrile-butadiene-styrene copolymers, epoxies, nylons, or the like.

The adhesive tape with two adhesive layers can be and often is optically clear. An optically clear adhesive tape can be positioned, for example, between a first substrate and a second substrate such that the second substrate can be seen by viewing through both the first substrate and the second substrate. The second substrate preferably can be viewed without distortion through both the first substrate and the optically clear, stretch releasable adhesive tape. The second substrate and the first substrate can be, for example, optically coupled. As used herein, the term "optically coupled" means that the any air gap between the first substrate and the second substrate has been eliminated. An air gap can lead to mismatching of refractive indexes between substrates. The optical coupling of the substrates often leads to enhanced brightness and enhanced contrast. Further, the coupling of the substrates can provide increased structural support.

At least one of the substrates used in combination with an optically clear stretch releasable adhesive tape is often selected to be optically clear or transparent. The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); conductive or insulating; and polarizing or non-polarizing. The resulting articles can be an optical element or can be used to prepare an optical element. As used herein, the term "optical element" refers to an article or component that has an optical effect or optical application. The optical element can be used, for example, in an electronic display, projection devices or applications, photonics devices or applications, or graphic devices or applications.

In some of these devices and applications, the first substrate and second substrate are often independently selected from a display (e.g, electronic display), polarizer, touch panel, lens, reflector, diffraction grating, mirror, projection prism, or multilayer optical film. Exemplary substrates include, but are not limited to, the outer surface of an electronic display such as liquid crystal display, electrowetting display, plasma display, cathode ray tube, or touch sensor.

More particularly, an article is provided that includes a first substrate, a second substrate, and a stretch releasable adhesive tape positioned between the first substrate and the second substrate. The first substrate and second substrate are each independently selected from a display, polarizer, touch panel, lens, reflector, diffraction grating, mirror, projection prism, or multilayer optical film. The stretch releasable adhesive tape is optically clear and couples the first substrate to the second substrate. The second substrate is visible when viewed through both the first substrate and the adhesive tape. The stretch releasable adhesive tape includes (A) a backing layer that contains a first acrylic copolymer, (B) a first pressure-sensitive adhesive layer that is adjacent to a first major surface of the backing layer and a second pressure-sensitive adhesive layer that is adjacent to a second major surface of the backing layer, wherein each pressure-sensitive adhesive layer includes a second acrylic compound and inorganic particles dispersed or suspended in the second acrylic compound, and (C) a tab that extends beyond at least one of the first substrate and the second substrate. The tab includes a part of the backing layer or is attached to the backing layer. The adhesive tape can be stretched at least 50 percent in a first direction without breaking. For example, the length of the adhesive tape can be increased at least 50 percent without breaking.

In some applications, the first substrate is a protective layer that is coupled to a second substrate that is part of an information display device. The protective layer can be a protective film, a layer of glass, a layer of polycarbonate, or the like. The protective layer can function, for example, as a cover lens for the information display device. Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, or signage such as graphic displays. In some applications, the bonding of a rigid cover to the display screen with the elimination of any air gap between them can improve the quality of the displayed image.

In some specific applications, the optically clear, stretch releasable adhesive tape can couple an information display device and a cover lens prepared of glass or polycarbonate. That is, the article can have the following construction: cover lens—optically clear, stretch releasable adhesive tape—information display device. More specifically, the article can be arranged in the following order: cover lens—first optically clear adhesive layer—backing layer—second optically clear adhesive layer—information display device. The information display device can be viewed by looking through both the cover lens and the optically clear, stretch releasable adhesive tape. For example, the first substrate can be a cover lens and the second substrate can be a liquid crystal display. The outer surface of the liquid crystal display is often a polarizer. In other example, the first substrate can be a cover lens and the second substrate can be an electrowetting display with an outer surface that is predominately glass.

The optically clear adhesive tape can be used to couple together more than two substrates. That is, the articles can include more than two substrates and more than one optically clear adhesive tape. For example, the article could be arranged in the following order: first substrate—first optically clear, stretch releasable adhesive tape—second substrate—second optically clear, stretch releasable adhesive tape—third substrate. More specifically, the article would be arranged in the following order: first substrate—first optically clear adhesive layer—first backing layer—second optically clear adhesive layer—second substrate—third optically clear adhesive layer—second backing layer—fourth optically clear adhesive layer—third substrate. The third substrate can be viewed by looking through the first substrate, the first optically clear adhesive layer, the second substrate, and the second optically clear adhesive layer. For example, the first substrate can be a cover lens, the second substrate can be a touch panel, and the third substrate can be an information display device such as a liquid crystal display. Touch panels often have an outer surface of glass, polyester, or indium tin oxide.

Alternatively, the optically clear adhesive tapes can be used to couple two substrates together and another optically clear adhesive can be used to join additional substrates. For example, the article could be arranged in the following order—first substrate—optically clear adhesive—second substrate—optically clear, stretch releasable adhesive tape—third substrate. As a specific example, the first substrate can be a cover lens, the second substrate can be a touch panel, and the third substrate can be an information display device such as a liquid crystal display. This embodiment uses the stretch releasable adhesive tape only to couple the information display device to the rest of the article. Less expensive components can be coupled using an adhesive that is not stretch releasable.

In other applications, at least one of the substrates is an optical film. Any suitable optical film can be used in the articles. As used herein, the term "optical film" refers to a film that can be used to produce an optical effect. The optical films are typically polymer-containing films that can be a single layer or multiple layers. Some optical films have alternating layers of polymeric material with different indexes of refraction. Other optical films have alternating polymeric layers and metal-containing layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, infrared, or radio frequency regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films. Exemplary optical films are further described in the following patents: U.S. Pat. Nos. 6,049,419 (Wheatley et al.), 5,882,774 (Jonza et al.), 6,049,419 (Wheatley et al.), RE 34,605 (Schrenk et al.), 5,579,162 (Bjornard et al.), and 5,360,659 (Arends et al.).

The articles that include the two substrates coupled with the stretch releasable adhesive tape can be durable. As used herein, the term "durable" means that the articles can be subjected to elevated temperature (e.g., at least 50° C., at least 60° C., at least 70° C., at least 80° C., or at least 85° C.) and humidity conditions (e.g., at least 70 percent relative humidity, at least 75 percent relative humidity, at least 80 percent relative humidity, at least 85 percent relative humidity, or at least 90 percent relative humidity) without delamination. The elevated temperature and relative humidity conditions can be maintained for at least 1 day, at least 2 days, at least 3 days, at least 4 days, at least 5 days, at least 6 days, or at least 7 days. For example, the articles can be subjected to conditions such as 60° C. and 90 percent relative humidity or 85° C. and 85 percent relative humidity for 1 week without delamination. In many embodiments where the adhesive tape is optically clear, the adhesive tape remains optically clear even after exposure to the elevated temperature and humidity conditions. For example, the haze can remain no greater than 5 and the luminous transmission can be at least 90 percent. Preferably no bubbles form in the article and no optical distortions result from being subjected to the elevated temperature and humidity conditions.

Additionally, the adhesive tapes or pressure-sensitive adhesive layers preferably do not become yellow when exposed to the elevated temperature and humidity conditions. That is, the adhesive tapes can have resistance of ultraviolet radiation for extended periods of time. Still further, the adhesive tapes can be used under conditions where there is exposure to moisture. The adhesives can often be used in both indoor and outdoor applications.

The dual sided adhesive tape can be adhered to two substrates (i.e., the adhesive tape can be positioned between the two substrates) and then released from one or both substrates by stretching the backing layer and the adhesive layers of the adhesive tape. After being released, adhesive tape can be removed from between the two substrates and the substrates can be separated from each other. The adhesive tape can be constructed so that the first pressure-sensitive adhesive layer can be released from the first substrate prior to completely releasing the second pressure-sensitive adhesive from the second substrate. That is, the adhesive tape can be constructed to provide controlled sequential release from the first substrate and from the second substrate. This can often be accomplished by variation in the composition of the acrylic copolymer included in the first pressure-sensitive adhesive and the second pressure-sensitive adhesive. Alternatively, this can be accomplished by having non-adhesive zones in one of the pressure-sensitive adhesive layers as described in U.S. Pat. No. 6,001,471 (Bries et al.).

The coupling step of the two substrates with the adhesive tape can include providing the adhesive tape in a form that includes release liners adjacent to each adhesive layer. That is, the adhesive tape can be provided as a construction of layers arranged in the following order: first release liner—first adhesive layer—backing layer—second adhesive layer—second release liner. The first release liner can be removed to expose the first adhesive layer. The exposed first adhesive layer can then be positioned adjacent to the first substrate and adhered directly or indirectly to the first substrate. The second release liner can then be removed to expose the second adhesive layer. The exposed second adhesive layer can then be positioned adjacent to the second substrate and adhered directly or indirectly to the second substrate.

The dual sided adhesive tape can be adhered to two substrates (i.e., the adhesive tape can be positioned between the two substrates) and then released from one or both substrates by stretching the backing layer and the adhesive layers of the adhesive tape. After being released, adhesive tape can be removed from between the two substrates and the substrates can be separated from each other. For example, the adhesive tape can be released by stretching in the event that the coupling of the two substrates is defective. Defects during fabrication can result from misalignment of the two substrates, entrapment of bubbles between the two substrates, or formation of patterns or creases. Alternatively, the substrates can be separated to re-use at least one of the substrates. Typically, the stretch releasing adhesive tape can be cleanly removed from between the substrates with little or no visible adhesive residue remaining on either substrate. Additionally, the stretch releasing adhesive tape usually can be removed without damaging the appearance, function, or performance of either substrate.

Also, over the lifetime of the device, if it is desirable to remove one of the substrates for replacement or recycling, the two substrates can be separated by stretch releasing the adhesive tape between the substrates. The substrates can be separated without damage to either substrate. This is an advantage over many other separation methods that typically introduce levels of stress than can damage one or both of the substrates. Such separation can be very difficult with many known pressure-sensitive adhesives.

In some applications it may be desirable to use a winding tool to aid the stretch release process and facilitate removal of the adhesive tape from between the two substrates. Such a winding tool can be as simple as a cylinder to which the tab of the adhesive tape is attached. The winding tool can be rotated to permit winding of the adhesive tape as it is stretched. Such a process could be mechanized using a powered roller of sufficient width so that the entire width of the tab can be simultaneously and smoothly pulled to release the adhesive tape from the substrates by zero degree peel. The stress and the rate of strain applied to the adhesive tape by the mechanized device could be controlled to release and remove the adhesive tape without tearing the backing layer and without leaving any adhesive residue on the substrates. The mechanized approach would be particularly advantageous for the decoupling of large substrates such as large format electronic displays or graphics. Vacuum manipulation devices could be used to lift and support the substrates during the decoupling step. By securing the substrates with vacuum manipulation tools, the substrates could be secured without introducing additional compressive force on the adhesive tape that could inhibit or prevent the release and removal of the adhesive tape from between the two substrates. Also, the vacuum manipulation tools could be used to collect the substrates without damage after removal of the adhesive tape.

EXAMPLES

These examples are for illustrative purposes only and are not meant to be limiting on the scope of the appended claims. All parts, percentages, and ratios in the examples and the rest of the specification are based on weight, unless noted otherwise. Solvents and other reagents used were obtained from Sigma-Aldrich Chemical Company (Milwaukee, Wis.) unless otherwise noted.

Materials

Butyl acrylate is an alkyl acrylate purchased from Mitsubishi Chemical Co. (Minato-ku, Tokyo-to, Japan).

2-Ethylhexyl acrylate is an alkyl acrylate purchased from Nihon Shokubai Co., Ltd. Z9Himeji, Hyogo, Japan).

2-Hydroxyethyl acrylate (2-HEA) is a polar monomer commercially available from Dow Chemical Co. (Freeport, Tex.).

Isooctyl acrylate is an alkyl acrylate is commercially available under that trade designation SR-440 from Sartomer (Exton, Pa.).

Isostearyl acrylate is an alkyl acrylate purchased from Shin-Nakamura Chemical Co., Ltd. (Arimoto, Wakayama, Japan).

Isobornyl acrylate is an alkyl acrylate purchased from Osaka Organic Chemical Industry Ltd. (Chuou-ku, Osaka-fu, Japan).

Cyclohexyl acrylate is an alkyl acrylate purchased from Toagosei Co., Ltd. (Minato-ku Tokyo Japan).

Methoxy polyethylene glycol acrylate (MPGA) is commercially available from Sartomer (Exton, Pa.) and has a weight average molecular weight of about 550 grams/mole.

N-vinyl caprolactam is commercially available from Aldrich (St. Louis, Mo.).

Tert-octyl acrylamide is commercially available from BASF Corporation (Parrispany, N.J.).

Benzyl acrylate is an aralkyl acrylate purchased from Ciba Specialty Chemicals K.K. (Minato-ku, Tokyo, Japan).

Acrylic acid is a polar monomer purchased from Kyoeisha Chemical Co., Ltd. (Minato-ku Tokyo Japan) or from Toagosei Co., Ltd. (Minato-ku Tokyo Japan).

2,2-dimethoxy-2-phenyl acetophenone is a photoinitator commercially available from Ciba Specialty Chemicals K.K. (Minato-ku, Tokyo, Japan).

1,6-Hexanediol Diacrylate is a crosslinker purchased from Kyoeisha Chemical Co., Ltd. (Nara-shi Nara Japan).

Neopentylglycol hydroxypivalate diacrylate modified caprolactone is a crosslinker purchased from Nippon Kayaku Co., Ltd. (Chiyoda-ku, Tokyo-to, Japan) under the trade designation KAYARAD HX-620.

AEROSIL R972 is a trade designation for a hydrophobic fumed silica commercially available from Nippon Aerosil (Shinjuku-ku, Tokyo-to, Japan).

AEROSIL R300 is a trade designation for a hydrophilic fumed silica commercially available from Nippon Aerosil (Shinjuku-ku, Tokyo-to, Japan).

NANOGEL is a trade designation for a silica aerogel powder (grade OBD201) that is commercially available from Cabot Corp., (Billerica, Mass.). The particles have an average particle size of about 8 microns.

Test Methods

Ultimate Tensile Elongation/Ultimate Tensile Strength—Method A

Test strips of the backing layer were prepared so that the dimensions were 10 mm in width and 70 mm in length. Both ends of the test strips were clamped in the load cell (Shimasdzu: AGS-100D) of the tensile tester using a samples gauge length of 20 mm. The sample was pulled at a crosshead speed of 500 mm/min until the strip was broken. The ultimate tensile strength ($N/cm^2$) and ultimate elongation (%) were reported.

Ultimate Tensile Elongation/UltimateTensile Strength—Method B

Method B was similar to method A but the sample was 12.5 mm in width and the gauge length was 25 mm. The crosshead speed was 305 mm/min.

Release Test—Method C

Test strips of the adhesive tapes were prepared having dimensions of 15 mm in width and 30 mm in length. Each adhesive tape had a backing layer and two pressure-sensitive adhesive layers. A 20 mm portion of the adhesive tape was positioned between a poly(methyl methacrylate) substrate (MR-200 from Mitsubishi Rayon) and a glass substrate (Eagle 2000 from Nihon Tact Co., Ltd.) leaving 10 mm of the adhesive tape available to function as the pulling tab. The resulting article was dwelled with a 1 kilogram weight (the weight was positioned on top of the article) for 20 minutes. The sample was mounted in the tensile tester so one jaw clamped the tab while the other clamped the substrates and then pulled at a speed of 500 mm/min speed with a load cell (Shimasdzu: AGS-100D). The tab of the sample was pulled and stretched from between the two substrates. The results were characterized by either a "Yes" indicating that the adhesive tape was cleanly removed from between the two substrate or a "No" indicating that the adhesive tape tore before the tape strip was completely removed from the substrate or substantial residue was left on the substrate.

Release Test—Method D

A double-coated adhesive tape strip (1.25 cm×2.5 cm) was placed between two glass microscope slides (7.6 cm by 3.80 cm) leaving a 25 mm tab protruding from one end of the assembly. The assembly was pressed twice with a 4.5 kg roller to firmly bond the sample to the slides. The assembly was mounted in a tensile testing machine (Instron model 4501, Instron Co, Canton, Mass.) so that the glass slides were gripped in the lower (fixed) jaws, and the tab was clamped in the upper (crosshead) jaws. The jaws were separated at a rate of 30.5 cm/min, and the average force required to effect debonding (i.e., release) by stretching (called debond stress in N/cm2) was recorded. The results were characterized by either a "Yes" indicating that the adhesive tape was cleanly removed from between the two substrate or a "No" indicating that the adhesive tape tore before the tape strip was completely removed from the substrate (glass slides) or substantial residue was left on the substrate.

Haze and Luminous Transmission

Percent haze and percent luminous transmission were determined by following the ASTM method D1003-07. The measurements were made using a spectrophotometer from BYK Gardner (Columbia, Md.) that is commercially available under the trade designation GARDNER BYK COLOR TCS PLUS Model 8870. CIE Standard Illuminant A was used.

Preparatory Example 1

Pressure-Sensitive Adhesive A

A pressure-sensitive adhesive syrup was prepared from an initial mixture of 2-ethylhexyl acrylate (90 parts), acrylic acid (10 parts), and 2,2-dimethoxy-2-phenyl acetophenone initiator (0.04 phr). As used herein, the abbreviation "phr" refers to parts per 100 parts resin. This initial mixture was partially polymerized by ultraviolet radiation under nitrogen atmosphere until the Brookfield viscosity was between 1000 and 3000 centipoises. Following partial polymerization, 2,2-dimethoxy-2-phenyl acetophenone initiator (0.2 phr) was added along with 1,6-hexanediol diacrylate crosslinker (0.08 phr). The resulting mixture was mixed thoroughly using a propeller mixer and then was degassed carefully in a desiccator using a vacuum pump. A coating with a wet thickness of 50 micrometers of the syrup was applied to a polyethylene phthalate film treated with silicone release (Teijin DuPont Films Japan Ltd.). The coating was exposed to UVA (ultraviolet radiation) light with a dosage of about 900 mJ per square centimeters for the curing process to take place.

Preparatory Example 2

Pressure-Sensitive Adhesive B

Another pressure-sensitive adhesive layer was prepared as described for Preparatory Example 1 except that fumed silica (10 phr, AEROSIL R972) was mixed with the syrup before coating.

Preparatory Example 3

Pressure-Sensitive Adhesive C

A pressure-sensitive adhesive syrup was prepared from an initial mixture of 2-ethylhexyl acrylate (75 parts), isobornyl acrylate (15 parts), 2-HEA (10 parts), and 2,2-dimethoxy-2-phenyl acetophenone initiator (0.04 phr). This initial mixture was partially polymerized by ultraviolet radiation under nitrogen atmosphere until the Brookfield viscosity was between 1000 and 3000 centipoises. Following partial polymerization, 2,2-dimethoxy-2-phenyl acetophenone initiator (0.2 phr) was added along with 1,6-hexanediol diacrylate crosslinker (0.03 phr) and fumed silica (10 phr, AEROSIL R300). The resulting mixture was mixed thoroughly using a propeller mixer. A coating with a wet thickness of 50 micrometers of the syrup was applied to a polyethylene phthalate film treated with silicone release (Teijin DuPont Films Japan Ltd.). The coating was exposed to UVA (ultraviolet radiation) light with a dosage of about 900 mJ per square centimeters for the curing process to take place.

Preparatory Example 4

Pressure-Sensitive Adhesive D

Another pressure-sensitive adhesive layer was prepared using the procedure of Preparatory Example 3 except that fumed silica AEROSIL R300 (10 phr) was replaced with fumed silica AEROSIL R972 (10 phr).

Preparatory Example 5

Pressure-Sensitive Adhesive E

Another pressure-sensitive adhesive layer was prepared using the procedure of Preparatory Example 3 except that the monovalent monomers were replaced with isooctyl acrylate (90 phr) and tert-octyl acrylamide (10 phr) and the fumed silica was replaced with AEROSIL R972 (10 phr).

Preparatory Example 6

Pressure-Sensitive Adhesive F

Another pressure-sensitive adhesive layer was prepared using the procedure of Preparatory Example 3 except that the monovalent monomers were replaced with isooctyl acrylate (90 phr) and tert-octyl acrylamide (10 phr). The fumed silica was replaced with AEROSIL R972 (5 phr).

Preparatory Example 7

Pressure-Sensitive Adhesive G

Another pressure-sensitive adhesive layer was prepared as described for Preparatory Example 1 except that silica aerogel powder (10 phr, NANOGEL grade OBD201) was mixed with the syrup before coating.

Example 1

A syrup was prepared from an initial mixture that contained 2-ethylhexyl acrylate (66 parts), isobornyl acrylate (22 parts), acrylic acid (10 parts), and 2,2-dimethoxy-2-phenyl acetophenone initiator (0.04 phr). This initial mixture was partially polymerized by ultraviolet radiation under nitrogen atmosphere until the Brookfield viscosity was between 1000 and 3000 centipoise. Following partial polymerization, neopentylglycol hydroxypivalate diacrylate modified caprolactone (0.1 phr) and additional 2,2-dimethoxy-2-phenyl acetophenone initiator (0.2 phr) were added to the syrup. The mixture was mixed thoroughly using a propeller mixer and then was degassed carefully in a desiccator using a vacuum pump. A layer of the syrup with a wet thickness of 200 micrometers was coated on polyethylene phthalate film treated with silicone release and was exposed to UVA light for the curing process to take place. The resulting cured layer was the backing layer.

A sample of Pressure-sensitive Adhesive Layer B was laminated to both major surfaces of the backing layer to construct a three layered adhesive tape with the backing layer in the middle.

The test results for Example 1 is included in Table 2.

Examples 2 to 7

Examples 2 to 7 were prepared in a manner similar to that described for Example 1 using the monomer mixtures shown in Table 1. The pressure-sensitive adhesive layers (PSA layer) laminated to the backing layer for each example is also identified in Table 1. The test results for Examples 2 to 8 are included in Table 2. Method A was used to determine the ultimate tensile strength and the ultimate tensile elongation. Method C was used to check the clean removal of the strip.

TABLE 1

Composition of Examples 1 to 7

| Component | Ex. 1 | Ex. 2 | Ex. 3 | Ex. 4 | Ex. 5 | Ex. 6 | Ex. 7 |
|---|---|---|---|---|---|---|---|
| Butyl Acrylate | 0 | 0 | 60 | 0 | 0 | 0 | 0 |
| 2-Ethylhexyl Acrylate | 66 | 70 | 0 | 0 | 0 | 76 | 59 |
| Isooctyl acrylate | 0 | 0 | 0 | 64 | 0 | 0 | 0 |
| Isostearyl acrylate | 0 | 0 | 0 | 0 | 67 | 0 | 0 |
| Isobornyl acrylate | 22 | 20 | 0 | 0 | 23 | 0 | 38 |
| Cyclohexyl acrylate | 0 | 0 | 0 | 22 | 0 | 0 | 0 |
| Benzyl acrylate | 0 | 0 | 22 | 0 | 0 | 1 | 0 |
| Acrylic Acid | 12 | 10 | 18 | 14 | 10 | 23 | 3 |
| 2,2-dimethoxy-2-phenyl acetophenone | 0.24 | 0.24 | 0.24 | 0.24 | 0.24 | 0.24 | 0.24 |
| 1,6-Hexanediol Diacrylate | 0 | 0 | 0.1 | 0 | 0.1 | 0 | 0 |
| Neopentylglycol hydroxypivalate diacrylate modified caprolactone | 0.1 | 0.1 | 0 | 0.1 | 0 | 0.05 | 0.05 |

TABLE 1-continued

Composition of Examples 1 to 7

| Component | Ex. 1 | Ex. 2 | Ex. 3 | Ex. 4 | Ex. 5 | Ex. 6 | Ex. 7 |
|---|---|---|---|---|---|---|---|
| Fumed silica (AEROSIL R972) | 0 | 10 | 0 | 0 | 0 | 0 | 10 |
| PSA Layer | B | B | B | B | B | B | B |

TABLE 2

Testing of Examples 1 to 7

| | Ex. 1 | Ex. 2 | Ex. 3 | Ex. 4 | Ex. 5 | Ex. 6 | Ex. 7 |
|---|---|---|---|---|---|---|---|
| Ultimate Tensile Strength, [N/cm2] | 750 | 1546 | 1593 | 1054 | 1074 | 2741 | 737 |
| Ultimate Tensile Elongation, % | 1017 | 889 | 978 | 928 | 900 | 817 | 1222 |
| Clean removal | Yes | Yes | Yes | Yes | Yes | Yes | Yes |

Examples 8 to 13

Examples 8 to 13 were prepared in a manner similar to that described for Example using the monomer mixtures shown in Table 3. The pressure-sensitive adhesive layers are laminated to the backing layer for each example is also identified in Table 3. The test results for Example 8 to 13 are included in Table 4. Method D was used to check the clean removal of the sample and determine the debond stress.

TABLE 3

Composition of Examples 8 to 12

| Component | Ex. 8 | Ex. 9 | Ex. 10 | Ex. 11 | Ex. 12 | Ex. 13 |
|---|---|---|---|---|---|---|
| Isooctyl acrylate | 68 | 68 | 52 | 68 | 52 | 52 |
| Isobornyl acrylate | 0 | 0 | 29 | 0 | 29 | 29 |
| MPGA | 0 | 0 | 19 | 0 | 19 | 19 |
| N-vinyl caprolactam | 32 | 32 | 0 | 32 | 0 | 0 |
| 1,6-Hexanediol Diacrylate | 0.1 | 0.1 | 0.2 | 0.1 | 0.2 | 0.2 |
| Fumed silica (AEROSIL R972) | 7 | 7 | 0 | 7 | 0 | 0 |
| PSA Layer | C | E | C | F | D | G |

TABLE 4

Testing of Examples 8 to 12

| | Ex. 8 | Ex. 9 | Ex. 10 | Ex. 11 | Ex. 12 | Ex. 13 |
|---|---|---|---|---|---|---|
| Tensile pulling Strength, [N/cm2] | 254 | 510 | 137 | 432 | 138 | 152 |
| Clean removal | Yes | Yes | Yes | Yes | Yes | Yes |
| Transmission, % | | | | | 90 | |
| Haze, % | | | | | 1.3 | |

Comparative Example 1

A syrup was prepared from an initial mixture that contained 100 parts of butyl acrylate, and 0.04 phr (parts per hundred syrup) of 2,2-dimethoxy-2-phenyl acetophenone initiator. The initial mixture was partially polymerized to reach a Brookfield viscosity between 1000 and 3000 cPoise by ultra violet radiation under nitrogen atmosphere. After partial polymerization, 0.1 phr of 1,6-hexanediol diacrylate plus an additional 0.2 phr of 2,2-dimethoxy-2-phenyl acetophenone initiator was added to the syrup. The mixture was thoroughly mixed with a propeller mixer and then was carefully degassed in a desiccator using a vacuum pump. A wet thickness of 200 micrometers of the syrup was coated on polyethylene phthalate film treated with silicone release and was exposed to UVA light for the curing process to take place. The resulting cured layer was the backing layer.

A sample of Pressure-sensitive Adhesive Layer A was laminated to both major surfaces of the backing layer to construct a three layered adhesive tape with the backing layer in the middle.

The test results for this comparative example is included in Table 4.

Comparative Examples 2 to 4

Comparative Examples 2 to 4 were prepared in a manner similar to that described for Comparative Example 1 using the monomer mixtures shown in Table 2. The pressure-sensitive adhesive layers (PSA layer) laminated to the backing layer for each example is also identified in Table 5. The test results for these comparative examples are included in Table 6. Method A was used to determine the ultimate tensile strength and ultimate elongation of the sample. Method C was used to check the clean removal of the test sample.

TABLE 5

Compositions of Comparative Examples 1 to 4

| | Comp. Ex. 1 | Comp. Ex. 2 | Comp. Ex. 3 | Comp. Ex. 4 |
|---|---|---|---|---|
| Butyl Acrylate | 100 | 0 | 0 | 0 |
| 2-Ethylhexyl Acrylate | 0 | 100 | 0 | 50 |
| Isostearyl acrylate | 0 | 0 | 100 | 0 |
| Isobornyl acrylate | 0 | 0 | 0 | 10 |
| Acrylic Acid | 0 | 0 | 0 | 40 |
| 2,2-dimethoxy-2-phenyl acetophenone | 0.24 | 0.24 | 0.24 | 0.24 |
| 1,6-Hexanediol Diacrylate | 0.1 | 0.1 | 0.1 | 0.1 |
| PSA Layer | A | B | B | B |

TABLE 6

Testing of Compoarative Examples 1 to 4

| | Comp Ex. 1 | Comp Ex. 2 | Comp Ex. 3 | Comp Ex. 4 |
|---|---|---|---|---|
| Ultimate tensile Strength, [N/cm2] | 324 | 207 | 365 | 3500 |
| Ultimate Tensile Elongation, % | 1044 | 1000 | 1039 | 228 |
| Clean removal | No (tape tear) | No (tape tear) | No (tape tear) | No (tape tear) |

We claim:
1. An adhesive tape comprising:
a backing layer comprising
(1) a first acrylic copolymer comprising a first polymerized product of a first polymerizable reaction mixture comprising
(a) a first crosslinker having at least two (meth)acryloyl groups in an amount up to 70 weight percent based on a total weight of polymerizable material in the first polymerizable reaction mixture; and
(b) either
(i) a first monovalent monomer mixture comprising
1) a low Tg yielding acrylic monomer in an amount equal to at least 40 weight percent based on the total weight of polymerizable material in the first polymerizable reaction mixture, wherein the low Tg yielding acrylic monomer has a glass transition temperature no greater than 20° C. when polymerized to form a homopolymer; and
2) a first polar monomer in an amount up to 35 weight percent based on the total weight of polymerizable material in the first polymerizable reaction mixture; or
(ii) a partially polymerized product of the first monovalent monomer mixture; and
a first pressure-sensitive adhesive layer that is adjacent to a first major surface of the backing layer and a second pressure-sensitive adhesive layer that is adjacent to a second major surface of the backing layer, wherein the first pressure-sensitive adhesive layer and the second pressure-sensitive adhesive layer each comprise
(1) a second acrylic copolymer that is different than the first acrylic copolymer, the second acrylic copolymer comprising a second polymerized product of a second polymerizable reaction mixture comprising
(a) a second crosslinker having at least two (meth)acryloyl groups in an amount up to 25 weight percent based on a total weight of polymerizable material in the second polymerizable reaction mixture; and
(b) either
(i) a second monovalent monomer mixture comprising
1) an alkyl(meth)acrylate having an alkyl group with at least 4 carbon atoms in an amount equal to at least 40 weight percent based on the total weight of polymerizable material in the second polymerizable reaction mixture; and
2) a second polar monomer in an amount up to 40 weight percent based on the total weight of polymerizable material in the second polymerizable reaction mixture; or
(ii) a partially polymerized product of the second monovalent monomer mixture; and
(2) inorganic particles dispersed or suspended in the second acrylic copolymer in an amount up to 25 weight percent based on the total weight of second acrylic copolymer,
wherein, the adhesive tape is stretch releasing and is stretchable at least 50 percent in a first direction without breaking.

2. The adhesive tape of claim 1, wherein the backing layer further comprises inorganic particles dispersed or suspended in the first acrylic copolymer.

3. The adhesive tape of claim 1, wherein the first monovalent monomer mixture further comprises a high Tg yielding acrylic monomer in an amount up to 40 weight percent based on the total weight of the first polymerizable reaction mixture, wherein the high Tg yielding acrylic monomer has a Tg of at least 40° C. when polymerized to form a homopolymer.

4. The adhesive tape of claim 1, wherein the adhesive tape is stretchable at least 300 percent in the first direction without breaking.

5. The adhesive tape of claim 1, wherein the inorganic particles in the pressure-sensitive adhesive layer comprises silica.

6. The adhesive tape of claim 5, wherein the silica is selected from fumed silica or silica aerogel particles.

7. An article comprising:
a first substrate;
a second substrate; and an adhesive tape positioned between the first substrate and the second substrate, wherein the adhesive tape couples the first substrate to the second substrate and wherein the adhesive tape comprising (A) a backing layer comprising
  (1) a first acrylic copolymer comprising a first polymerized product of a first polymerizable reaction mixture comprising
    (a) a first crosslinker having at least two (meth)acryloyl groups in an amount up to 70 weight percent based on a total weight of polymerizable material in the first polymerizable reaction mixture; and
    (b) either
      (i) a first monovalent monomer mixture comprising
        1) a low Tg yielding acrylic monomer in an amount equal to at least 40 weight percent based on the total weight of polymerizable material in the first polymerizable reaction mixture, wherein the low Tg yielding acrylic monomer has a glass transition temperature no greater than 20° C. when polymerized to form a homopolymer; and
        2) a first polar monomer in an amount up to 35 weight percent based on the total weight of polymerizable material in the first polymerizable reaction mixture; or
      (ii) a partially polymerized product of the first monovalent monomer mixture; and
(B) a first pressure-sensitive adhesive layer that is adjacent to a first major surface of the backing layer and a second pressure-sensitive adhesive layer that is adjacent to a second major surface of the backing layer, wherein the first pressure-sensitive adhesive layer and the second pressure-sensitive adhesive layer each comprise
  (1) a second acrylic copolymer that is different than the first acrylic copolymer, the second acrylic copolymer comprising a second polymerized product of a second polymerizable reaction mixture comprising
    (a) a second crosslinker having at least two (meth)acryloyl groups in an amount up to 25 weight percent based on a total weight of polymerizable material in the second polymerizable reaction mixture; and
    (b) either
      (i) a second monovalent monomer mixture comprising
        1) an alkyl(meth)acrylate having an alkyl group with at least 4 carbon in an amount equal to at least 40 weight percent based on the total weight of polymerizable material in the second polymerizable reaction mixture; and
        2) a second polar monomer in an amount up to 40 weight percent based on the total weight of polymerizable material in the second polymerizable reaction mixture; or
      (ii) a partially polymerized product of the second monovalent monomer mixture; and
  (2) inorganic particles dispersed or suspended in the second acrylic copolymer in an amount up to 25 weight percent based on the weight of the second acrylic copolymer; and
(C) a tab that extends beyond at least one of the first substrate and the second substrate, wherein pulling the tab stretches the adhesive tape and releases the adhesive tape from the first substrate, from the second substrate, or from both the first substrate and the second substrate and wherein the adhesive tape is stretchable to at least 50 percent in a first direction without breaking when the tab is pulled.

8. The article of claim 7, wherein the adhesive tape is optically clear and wherein first substrate and second substrate are each independently selected from a display, polarizer, touch panel, lens, reflector, diffraction grating, mirror, projection prism, or multilayer optical film.

9. The article of claim 7, wherein the adhesive tape is optically clear the second substrate is visible when viewed through the first substrate and the adhesive tape.

10. The article of claim 7, wherein the backing layer further comprises inorganic particles dispersed or suspended in the first acrylic copolymer.

11. The article of claim 7, wherein the first monovalent monomer mixture further comprises a high Tg yielding acrylic monomer in an amount up to 40 weight percent based on the total weight of the first polymerizable reaction mixture, wherein the high Tg yielding acrylic monomer has a Tg of at least 40° C. when polymerized to form a homopolymer.

12. The article of claim 7, wherein the adhesive tape is stretchable to at least 300 percent in the first direction without breaking.

13. An article comprising:
a first substrate; and
an adhesive tape adhered to the first substrate, the adhesive tape comprising
  (A) a backing layer comprising
    (1) a first acrylic copolymer comprising a first polymerized product of a first polymerizable reaction mixture comprising
      (a) a first crosslinker having at least two (meth)acryloyl groups in an amount up to 70 weight percent based on a total weight of polymerizable material in the first polymerizable reaction mixture; and
      (b) either
        (i) a first monovalent monomer mixture comprising
          1) a low Tg yielding acrylic monomer in an amount equal to at least 40 weight percent based on the total weight of polymerizable material in the first polymerizable reaction mixture, wherein the low Tg yielding acrylic monomer has a glass transition temperature no greater than 20° C. when polymerized to form a homopolymer; and
          2) a first polar monomer in an amount up to 35 weight percent based on the total weight of polymerizable material in the first polymerizable reaction mixture; or
        (ii) a partially polymerized product of the first monovalent monomer mixture; and
  (B) a first pressure-sensitive adhesive layer that is adjacent to a first major surface of the backing layer, wherein the first pressure-sensitive adhesive layer comprises
    (1) a second acrylic copolymer that is different than the first acrylic copolymer, the second acrylic copolymer comprising a second polymerized product of a second polymerizable reaction mixture comprising
      (a) a second crosslinker having at least two (meth)acryloyl groups in an amount up to 25 weight percent based on a total weight of polymerizable material in the second polymerizable reaction mixture; and
      (b) either
        (i) a second monovalent monomer mixture comprising 1) an alkyl(meth)acrylate having an alkyl group with at least 4 carbon in an amount equal to at least 40 weight percent based on the total weight of polymerizable material in the second polymerizable reaction mixture; and 2) a second polar monomer in an amount up to 40 weight percent based on the total weight of polymerizable material in the second polymerizable reaction mixture; or (ii) a partially polymerized product of the second monovalent monomer mixture; and (2) inorganic particles dispersed or suspended in the second acrylic copolymer in an amount up to 25 weight percent based on the weight of the second acrylic copolymer; and (C) a tab that extends beyond the first substrate, wherein pulling the tab stretches the adhesive tape and releases the adhesive tape from the first substrate and wherein the adhesive tape is stretchable to at least 50 percent in a first direction without breaking when the tab is pulled.

14. A method of coupling and decoupling two substrates, the method comprising:

providing a first and second substrate;

positioning an adhesive tape between the first substrate and the second substrate, wherein the adhesive tape couples the first substrate to the second substrate, the adhesive tape comprising (A) a backing layer comprising (1) a first acrylic copolymer comprising a first polymerized product of a first polymerizable reaction mixture that comprises (a) a first crosslinker having at least two (meth)acryloyl groups in an amount up to 70 weight percent based on a total weight of polymerizable material in the first polymerizable reaction mixture; and (b) either (i) a first monovalent monomer mixture comprising 1) a low Tg yielding acrylic monomer in an amount equal to at least 40 weight percent based on the total weight of polymerizable material in the first polymerizable reaction mixture, wherein the low Tg yielding acrylic monomer has a glass transition temperature no greater than 20° C. when polymerized to form a homopolymer; and 2) a first polar monomer in an amount up to 35 weight percent based on the total weight of polymerizable material in the first polymerizable reaction mixture; or (ii) a partially polymerized product of the first monovalent monomer mixture; and (B) a first pressure-sensitive adhesive layer that is adjacent to a first major surface of the backing layer and a second pressure-sensitive adhesive layer that is adjacent to a second major surface of the backing layer, wherein the first pressure-sensitive adhesive layer and the second pressure-sensitive adhesive layer each comprise (1) a second acrylic copolymer that is different than the first acrylic copolymer, the second acrylic copolymer comprising a second polymerized product of a second polymerizable reaction mixture comprising (a) a second crosslinker having at least two (meth) acryloyl groups in an amount up to 25 weight percent based on a total weight of polymeric material in the second polymerizable reaction mixture;

(b) either (i) a second monovalent monomer mixture comprising 1) an alkyl(meth)acrylate having an alkyl group with at least 4 carbon in an amount equal to at least 40 weight percent based on the total weight of polymerizable material in the second polymerizable reaction mixture;

2) a second polar monomer in an amount up to 40 weight percent based on the total weight of polymerizable material in the second polymerizable reaction mixture; or (ii) a partially polymerized product of the second monovalent monomer mixture; and (2) inorganic particles dispersed or suspended in the second acrylic copolymer in an amount up to 25 weight percent based on the weight of the second acrylic copolymer; and (C) a tab that extends beyond at least one of the first substrate and the second substrate; and pulling on the tab of the adhesive tape to stretch the adhesive tape to release the adhesive tape from the first substrate, from the second substrate or from both the first substrate and the second substrate, wherein the adhesive tape is stretchable to at least 50 percent in a first direction without breaking.

15. The method of claim 14, wherein the backing layer further comprises up to 25 weight percent inorganic particles dispersed or suspended in the first acrylic copolymer.

16. The method of claim 14, wherein the adhesive tape is optically clear and wherein first substrate and second substrate are each independently selected from a display, polarizer, touch panel, lens, reflector, diffraction grating, mirror, projection prism, or multilayer optical film.

* * * * *

UNITED STATES PATENT AND TRADEMARK OFFICE
CERTIFICATE OF CORRECTION

PATENT NO. : 8,557,378 B2  
APPLICATION NO. : 13/142004  
DATED : October 15, 2013  
INVENTOR(S) : Michiko Yamanaka et al.

Page 1 of 2

It is certified that error appears in the above-identified patent and that said Letters Patent is hereby corrected as shown below:

In the Specification

Column 9
Line 48, delete "breaking" and insert -- breaking. --, therefor.

Column 11
Line 42, delete "polypropylene" and insert -- poly(propylene --, therefor.

Column 12
Line 27, delete "2-naphtyl" and insert -- 2-naphthyl --, therefor.

Line 52, delete "photoinitator," and insert -- photoinitiator, --, therefor.

Lines 52-53, delete "photoinitator" and insert -- photoinitiator --, therefor.

Column 15
Line 61, delete "photoinitator" and insert -- photoinitiator --, therefor.

Column 16
Line 18, delete "photoinitator" and insert -- photoinitiator --, therefor.

Column 18
Line 28, delete "tetraethlyene" and insert -- tetraethylene --, therefor.

Column 22
Line 27, delete "photoinitator" and insert -- photoinitiator --, therefor.

Line 52, delete "photoinitator" and insert -- photoinitiator --, therefor.

Signed and Sealed this  
Twenty-second Day of April, 2014

Michelle K. Lee  
*Deputy Director of the United States Patent and Trademark Office*

CERTIFICATE OF CORRECTION (continued)
U.S. Pat. No. 8,557,378 B2

<u>Column 32</u>
Line 2, delete "Nihon Shokubai" and insert -- Nippon Shokubai --, therefor.

Line 23, delete "(Parrispany, N.J.)." and insert -- (Parsippany, N.J.). --, therefor.

Line 29, delete "photoinitator" and insert -- photoinitiator --, therefor.

Lines 53-54, delete "(Shimasdzu:" and insert -- (Shimadzu: --, therefor.

Line 59, delete "UltimateTensile" and insert -- Ultimate Tensile --, therefor.

<u>Column 33</u>
Line 11 (approx.), delete "(Shimasdzu:" and insert -- (Shimadzu: --, therefor.

<u>Column 37</u>
Line 44 (approx.), delete "Compoarative" and insert -- Comparative --, therefor.